(12) United States Patent
Li et al.

(10) Patent No.: US 6,668,011 B1
(45) Date of Patent: Dec. 23, 2003

(54) BLOCK DETECTION RECEIVER

(75) Inventors: Bin Li, Ottawa (CA); Wen Tong, Ottawa (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/335,845

(22) Filed: Jun. 18, 1999

Related U.S. Application Data

(63) Continuation-in-part of application No. 09/216,972, filed on Dec. 21, 1998.

(51) Int. Cl.[7] ............................................. H04B 1/707
(52) U.S. Cl. .................................... 375/147; 370/342
(58) Field of Search ............................. 375/130, 140, 375/147, 149; 370/209, 342, 441

(56) References Cited

U.S. PATENT DOCUMENTS

| | | | |
|---|---|---|---|
| 4,901,307 A | 2/1990 | Gilhousen et al. | 370/18 |
| 5,101,501 A | 3/1992 | Gilhousen et al. | 455/33 |
| 5,103,459 A | 4/1992 | Gilhousen et al. | 375/1 |
| 5,109,390 A | 4/1992 | Gilhousen et al. | 375/1 |
| 5,442,627 A | 8/1995 | Viterbi et al. | 370/22 |
| 5,778,030 A | 7/1998 | Bruckert et al. | |
| 5,790,596 A | 8/1998 | Sexton | |
| 5,930,305 A * | 7/1999 | Leib | 329/304 |
| 6,005,626 A * | 12/1999 | Ding | 375/240.16 |
| 6,233,271 B1 | 5/2001 | Jones et al. | |
| 6,249,539 B1 | 6/2001 | Harms et al. | |
| 6,295,311 B1 | 9/2001 | Sun | |

OTHER PUBLICATIONS

Chang, et al., "Comparison of Two Convolutional Orthogonal Coding Techniques for CDMA Radio Communications Systems", IEEE Transactions on Communications, vol. 43, No. 4, Jun. 1995, pp. 2029–2037.

* cited by examiner

*Primary Examiner*—Stephen Chin
*Assistant Examiner*—Kevin Kim

(57) ABSTRACT

A method and block detection receiver for detecting codes carried in a received signal processed into blocks of values. The method includes the steps of arranging the blocks into non-overlapping sets of at least two blocks per set; and for each set, executing a code detection operation over combinations of values, each combination containing one value from each block in the set. A single- or dual-maxima metric generator may be used. Preferably, the number of combinations of values is restricted and the values in a combination are weighted. The block detection receiver executes a form of sequence estimator. Accordingly, performance of the receiver is close to that of coherent detection and is much better than that of the conventional receivers which do not consider more than one consecutive block.

67 Claims, 10 Drawing Sheets

BLOCK DETECTION RECEIVER

RELATED APPLICATION

This application is a Continuation-in-Part of co-pending application Ser. No. 09/216,972 entitled "Block Detection Receiver", filed on Dec. 21, 1998 by Bin Li and Wen Tong and assigned to the assignee of the present application.

FIELD OF THE INVENTION

The present invention relates to spread-spectrum communications systems. More specifically, the present invention relates to a method and apparatus for receiving orthogonal signals in a spread-spectrum communications system.

BACKGROUND OF THE INVENTION

In a typical wireless communication system, a plurality of mobile stations is accommodated. Typically, more than one mobile station utilizes the wireless communications system at any given time. Such a communications system is sometimes called a multiple access communications system.

Radio frequency (RF) signals are used in multiple access communication systems to carry traffic between the mobile stations and base stations. With the enormous and ever increasing popularity of multiple access communications systems (e.g. cellular phone communications systems), the RF spectrum has become a very scarce resource. As a result, it is increasingly important for service providers of multiple access communication systems to efficiently use the RF spectrum allocated to them and to maximize the capacity of the multiple access communications systems to carry traffic.

Many different techniques which allow multiple mobile stations to access a multiple access communications system simultaneously have been utilized, such as time division multiple access (TDMA), frequency division multiple access (FDMA) and code division multiple access (CDMA). CDMA utilizes spread-spectrum modulation techniques which have certain advantages over TDMA and FDMA. Many new communications systems employed today utilize CDMA. The use of CDMA in a multiple access communications system is disclosed in U.S. Pat. No. 4,901,307 entitled "Spread-Spectrum Multiple Access Communications System Using Satellite or Terrestrial Repeaters" and issued to Qualcomm Incorporated on Feb. 13, 1993. This patent is incorporated by reference herein in its entirety.

A typical multiple access communications system which utilizes CDMA (a "CDMA Communications System") has not only a plurality of mobile stations but also a plurality of base stations with which the mobile stations communicate. In addition, a typical CDMA communications system has at least one forward CDMA channel and at least one reverse CDMA channel. Each forward CDMA channel and each reverse CDMA channel is assigned a unique non-overlapping frequency band. Typically, there is a guard frequency band between the frequency band(s) used by the forward channel(s) and the frequency band(s) used by the reverse channel(s).

Communications from the base stations to the mobile stations are carried in the forward CDMA channel(s). Each forward CDMA channel is composed of a plurality of code channels. The code channels share the frequency band assigned to the respective forward CDMA channel using spread-spectrum modulation techniques. Each mobile station is associated with a unique code channel.

Similarly, communications from the mobile stations to the base stations are carried in the reverse CDMA channel(s). Each reverse CDMA channel is composed of a plurality of code channels, typically called access channels and reverse traffic channels. The code channels share the frequency band assigned to the respective reverse CDMA channel using spread spectrum modulation techniques. Each mobile station is associated with a unique reverse traffic channel. The access channels are typically used to page or notify the base stations of outgoing calls.

In CDMA communications systems defined by ANSI Standard J-STD-008 or TIA/EIA Standard IS-95A, which are incorporated by reference herein, each frequency band utilized by the forward CDMA channel(s) and the reverse CDMA channel(s) is 1.23 MHZ wide. In addition, each forward CDMA channel and each reverse CDMA channel is further divided into 64 code channels.

In a CDMA communications system, the base stations may be satellites circulating the globe or stations located on the ground ("terrestrial base stations") or both. At the UHF or higher frequency bands commonly used by CDMA communications systems, a signal from a mobile station commonly arrives at a base station via a plurality of different paths, i.e. a plurality of signals are commonly received at the base station for each signal sent from the mobile station. Similarly, a signal from a base station directed to a mobile station commonly arrives at the mobile station via a plurality of different paths.

The time it takes (typically called a path delay) for a signal to arrive at its intended destination is commonly different for each path. Moreover, significant phase differences between the signals travelling on different paths may occur, especially at the UHF or higher frequency bands. In other words, signals may arrive at a base station from a mobile station (or at a mobile station from a base station) from many different directions or paths, each with a different path delay and phase. When signals are received at each base station and each mobile station, destructive summation of the signals may occur with, on occasion, deep fading. Such multipath fading is common at the UHF or higher frequency bands.

Multipath fading on the signals between the satellites and the mobile stations is not usually as severe as the multipath fading on the signals between the terrestrial base stations and the mobile stations. Since the satellites are normally located in a geosynchronous earth orbit, the distances between mobile stations and any given satellite are relatively the same. In addition, if a mobile station changes location, the distance between the mobile station and a satellite does not change significantly. In contrast, the distances between the mobile stations and the terrestrial base stations can vary quite significantly. One mobile station may be a few hundred feet away from a terrestrial base station and another mobile station in the same cell may be miles away from the same base station. In addition, if a mobile station changes position, the distance between the mobile station and the terrestrial base station may change significantly. Consequently, the change in the position of the mobile station may change the path delays and phases of all of the signals carried on the respective paths between the mobile station and the terrestrial base station.

In light of the above, signals between the satellites and the mobile stations typically experience fading that is characterized as Rician Fading. In contrast, signals between the terrestrial base stations and the mobile stations typically experience more severe fading that is characterized as Rayleigh Fading. The Rayleigh fading is due, in part, by the signals being reflected from a plurality of objects (e.g. buildings) between the mobile stations and the base stations.

Since a CDMA communications system utilizes a wide band signal in each forward CDMA channel and in each reverse CDMA channel, multipath fading typically only affects a small part of each wide band signal. In other words, CDMA inherently uses a form of frequency diversity to mitigate the deleterious affects of multipath fading.

In addition to frequency diversity, CDMA communications systems commonly use time diversity and space (or path) diversity to mitigate the deleterious affects of multipath fading. Time diversity is commonly employed through the use of repetition, time interleaving and error detection and correction decoding schemes. Space diversity is commonly employed in the reverse CDMA channel(s) through the use simultaneous communication links from each mobile station to a base station employing a plurality of antennas. Each antenna services one of the simultaneous communication links. Space diversity is also commonly employed in the forward CDMA channel(s) and in the reverse CDMA channel(s) by exploiting the unique characteristics of the spread-spectrum signals used by CDMA communications systems.

Many CDMA communications systems, such as CDMA communications systems defined by TIA/EIA Standard IS-95A ("IS-95 CDMA Communications Systems"), modulate the traffic carried in each code channel using high-speed pseudo-random noise (PN) modulation techniques at a PN chip rate. Each code channel within a reverse CDMA channel is assigned and modulated with a unique PN code to generate PN sequences (containing the traffic). The high speed PN modulation allows many different paths to be separated provided the difference in path delays exceed the inverse of the PN chip rate, typically called a PN chip duration.

However, the PN codes and the resulting sequences are not orthogonal. For short time intervals (e.g. an information bit), the cross correlations between different PN codes and the cross correlations between different PN sequences are random with a binomial distribution. Consequently, the traffic carried in each code channel typically interferes with the traffic carried in other code channels. To reduce the mutual interference and allow higher system capacity, many CDMA communications systems also modulate the traffic carried in each code channel with orthogonal binary sequences, such as Walsh codes, from a set of a fixed number of mutually orthogonal binary sequences. Each orthogonal binary sequence has a corresponding index symbol. For example, in a CDMA communications system defined by the IS-95A standard, 64 different Walsh codes are used. Consequently, every six bits of data traffic corresponds to one of the index symbols and are mapped to one of the 64 Walsh codes. The use of Walsh codes reduces the mutual interference and increases the system capacity to carry traffic.

The base stations typically send, in each forward CDMA channel, one or more pilot signals which are used by receivers in the mobile stations to coherently demodulate the traffic carried in the forward CDMA channels. However, due to power considerations, the mobile stations do not typically send a pilot signal to the base stations. Consequently, receivers at the base stations must typically use non-coherent demodulation techniques to demodulate or detect the traffic sent in the reverse traffic channels within each reverse CDMA channel.

Since it is more difficult to demodulate traffic using non-coherent demodulation than using coherent demodulation techniques, the capacity of many CDMA communications systems to handle traffic is limited by the ability of the receivers at the base station to detect, error-free, the traffic carried in the reverse traffic channels (within each reverse CDMA channel) using non-coherent demodulation techniques. Consequently, the capacity of many CDMA communications systems is limited by the performance of the receivers used at the base stations.

Each base station has at least one receiver with at least one antenna. Since each receiver typically services only one mobile station at a time, each base station typically has a plurality of receivers, one for each mobile station to be serviced simultaneously. Each receiver at the base station typically has a receiver section, a detector section and a decoder section.

A conventional approach used to maximize the performance of the receivers at the base stations is to optimize separately the detector section and the decoder section of each receiver.

With many CDMA communications systems, the mobile stations first encode the data bits of the traffic to data symbols at a fixed encoding rate using an encoding algorithm which facilitates subsequent maximum likelihood decoding of the data symbols into data bits by a decoder in the decoder section. Furthermore, the mobile stations also typically interleave the data symbols using an interleaver to generate interleaved data symbols. The interleaving of the data symbols helps to reduce the deleterious effects of multipath fading and improve the performance of the decoder section.

The mobile stations then map (or encode) the interleaved data symbols (containing the traffic) into orthogonal codes from a set of mutually orthogonal codes, such as Walsh codes. The use of orthogonal codes facilitates the detection of each data symbol carried in respective code channel by the detector and decoder sections of the receiver at the base station.

For each antenna at a base station, a single-maxima receiver or a dual-maxima receiver is commonly used. Each single-maxima receiver and each dual-maxima receiver commonly uses a rake receiver design. Such a design has two or more fingers, each finger being used for receiving and detecting signals carried on a respective one of the paths.

Referring to FIGS. 2 and 3, a single-maxima receiver 300 of the rake receiver design consists of an antenna 310, a receiver section 320, a detector section 330 and a decoder section 340. (Alternatively, more than one antenna 310 may be used for space or path diversity reception). The receiver section 320 is connected to the antenna 310 and to the detector section 330. The decoder section 340 is connected to the demodulator section 330.

The receiver section 320 consists of one receiver subsection. (If more than one antenna 310 is used, multiple receiver subsections would be employed, one for each antenna 310). Each receiver subsection consists of a searcher receiver and three data receivers. More or less than three data receivers can be used. (However, each receiver section must have one searcher receiver and at least one data receiver). For each RF signal sent by the mobile station, the searcher receiver searches the received spread-spectrum RF signals arriving via the various reverse paths at the antenna 310 for the strongest spread-spectrum RF signals associated with the mobile station. The searcher receiver then instructs the data receivers to track and receive the RF signals carried in the reverse paths with the strongest levels. Each data receiver typically receives and tracks a separate RF signal. In particular, each data receiver demodulates the respective spread-spectrum RF signal and translates the respective spread-spectrum RF signal from the RF frequency to a processed received signal at a lower frequency. Furthermore, each data receiver samples at the PN chip rate (e.g. 1.2288 Msamples/sec) the respective processed received signal to generate respective data samples 325A, 325B and 325C for the detector section 330 of the receiver 300.

The detector section 330 of the single-maxima receiver 300 consists of three detector subsections, a first subsection 400A, a second subsection 400B and a third subsection 400C. Each subsection 400A–C is associated with one of the data receivers in the receiver section 320. The combination of each data receiver with its corresponding subsection 400A–C is commonly called a finger of the single-maxima receiver 300 (using rake receiver terminology). If more data receivers are employed (or if more receiver sub-sections are employed), then a corresponding additional number of sub-sections would be employed.

The detector subsection 400A consists of a demodulator 410, a Walsh transformer circuitry 420 and squaring and summing circuitry 430. The Walsh transformer circuitry 420 is connected to the demodulator 410 and to the squaring and summing circuitry 430. The detector subsection 400A typically demodulates groups of samples 325A of the processed received signal into two groups of samples of subsignals using a demodulator—one group of samples 412 of an in phase signal and one group of samples 414 of a quadrature phase signal. The two groups of samples 412, 414 of subsignals are transformed into a block of complex transformer output signals 425 using the Walsh transformer circuitry 420. Typically, the Walsh transformer circuitry 420 consists of two fast Hadamard Transformers (FHT) which transform each group of samples 412 of the in phase signal and each group of samples 414 of the quadrature phase signal into two separate blocks of transformer output signals. The two blocks of transformer output signals are commonly represented using complex mathematics as one block of complex transformer output signals 425. A block of complex transformer output signals 425 may be called a transformer block.

Since Walsh codes are typically used in a CDMA communications system, a block of complex transformer output signals 425 is sometimes called a Walsh block. Each row of the block of complex transformer output signals 425 is a complex transformer output signal 425.

Each block of complex transformer output signals 425 is carried to the squaring and summing circuitry 430 which converts each block of complex transformer output signals 425 into groups of energy values 445A (or decision values). This is achieved by finding the square of the modulus of each row of the block of complex transformer output signals 425. Each energy value 445A within the group of energy values 445A associated with a particular group of samples 325A of the processed received signal represents a measure of confidence that the group of samples 325A of the processed received signal corresponds to a particular orthogonal code with a corresponding index value. Consequently, each row of the block of complex transformer output signals 425 (i.e. each transformer output signal) corresponds to a measure of confidence that a particular group of sampled signals 325A corresponds to a particular orthogonal code from within the set of mutually orthogonal codes. Since each orthogonal code from the set of mutually orthogonal codes has a corresponding index symbol, each energy value 445A has an associated index symbol.

Similarly, the other fingers generate groups of energy values 445B and 445C associated with groups of samples 325B and 325C respectively.

The detector subsections 400A–C are sometimes called correlator detectors since they correlate samples of the received signal with one of the orthogonal codes (e.g. one of the Walsh codes).

The energy values 445A–C from each finger are fed into the decoder section 340. The decoder section 340 of the receiver 300 attempts to recover the data bits originally sent. The decoder section 340 consists of a summer 500, a single-maxima metric generator 540, a deinterleaver 550 and a decoder 560. The summer 500 is connected to the squaring and summing circuitry 430 is each finger and to the single-maxima metric generator 540. The deinterleaver 550 is connected to the single-maxima metric generator 540 and to the decoder 560.

Using the summer 500 in the decoder section 340, each group of energy values 445A from the first detector subsection 400A is directly added with other groups of energy values 445B, 445C from the other detector subsections 400B–C in the other fingers according to their associated orthogonal code (or index symbol) to create a group of combined energy values 505. The combined energy value 505 for each index symbol is fed into the single-maxima metric generator 540.

Referring in particular to FIG. 3, the single-maxima metric generator 540 consists of a selector 515, an index mapper 520, a metric computer 525 and a multiplier 530. The selector 515 is connected to the summer 500, to the index mapper 520 and to the metric computer 525. The multiplier 530 is connected to the index mapper 520 and to the metric computer 525. The selector 515 selects the largest combined energy value 518 within each group of combined energy values 505. The largest combined energy value 505 represents the largest measure of confidence that the groups of samples 325A–C of the processed signal correspond to one of the orthogonal codes (sometimes called the most likely orthogonal code sent by the mobile station). Since each orthogonal code has a corresponding index symbol, the largest combined energy value 518 represents the largest measure of confidence that the groups of samples 325A–C of the received signal corresponds to one of the index symbols. The selector 515 also selects the symbol 517 (or index symbol) associated with the largest combined energy value 518 (i.e. the most likely orthogonal code). The index symbol 517 selected is carried to the index mapper 520 which maps the index symbol 517 into a plurality of "1" and "−1" soft decision bits 522. The largest combined energy value 517 is carried to the metric computer 525 which generates a scaling factor 527. The multiplier 530 then scales the soft decision bits 522 by the scaling factor 527 to produce soft decision data 545. The first bit in the soft decision data 545 represents a measure of confidence of the value of the first digit of index symbol (corresponding to the most likely orthogonal code). In other words, the first bit in the soft decision data 545 represents a measure of confidence of the value of the first digit of the interleaved data symbol actually sent. The second bit in the soft decision data 545 represents a measure of confidence of the value of the second digit of the index symbol (corresponding to the most likely orthogonal code) or the interleaved data symbol actually sent, and so on.

The soft decision data 545 is carried to the deinterleaver 550. The deinterleaver 550 deinterleaves the soft decision data 545, generating deinterleaved soft decision data 555. The deinterleaved soft decision data 555 is then carried to a decoder 560 (typically a Viterbi decoder) which decodes the deinterleaved data 555 into estimated digital traffic data bits 565.

Sometimes the base stations use simple single-maxima receivers that do not use the rake receiver design. Such receivers only have one finger.

The method used by a simple single-maxima receiver to generate the largest combined energy value $E_k$ for the $k^{th}$ block of complex transformer output signals $r_{k,i}$ where i denotes the index symbol of the transformer output can be represented mathematically fairly easily as follows:

$$E_k = \max \{|r_{k,1}|^2, |r_{k,2}|^2, \ldots |r_{k,N}|^2\}$$

where N is the total number of orthogonal codes used.

A single-maxima receiver is disclosed in U.S. Pat. No. 5,109,390 entitled "Diversity Receiver in CDMA Cellular Telephone System" and issued to the Qualcomm Incorporated on Apr. 28, 1992. This patent is incorporated by reference herein in its entirety.

To increase the system capacity, some CDMA communications systems use receivers typically called dual-maxima receivers. Dual-maxima receivers have improved bit error performance with respect to single-maxima receivers. The dual-maxima receiver may or may not use a rake receiver design.

Referring to FIG. 4, a dual-maxima receiver 600 of the rake receiver design consists of an antenna 310', a receiver section 320', a detector section 330' and a decoder section 605. The antenna 310', the receiver section 320', the detector section 330' are identical to the antenna 310, the receiver section 320 and the detector section 330 found in the single-maxima receiver 300 and operate in exactly the same way. The detector section 330' has three detector subsections 400A', 400B' and 400C' which are identical to the detector subsections 400A, 400B and 400C found in the single-maxima receiver 300 and operate in exactly the same way.

However, the dual-maxima receiver has a different decoder section 605. The decoder section 605 consists of a summer 500', a dual-maxima metric generator 610, a deinterleaver 550' and a decoder 560'. The summer 500', the deinterleaver 550' and the decoder 560' are identical to the summer 500, the deinterleaver 550 and the decoder 560 found in the single-maxima receiver 300 and operate in exactly the same way. However, the single-maxima metric generator 540 found in the single-maxima receiver 300 is replaced with the dual-maxima metric generator 610. The summer 500' is connected to each detector subsection 400A'–C' in the detector section 330' and to the dual-maxima metric generator 610. The deinterleaver 550' is connected to the dual-maxima metric generator 610 and to the decoder 560'.

The receiver section 320' has a searcher receiver and three data receivers. The searcher receiver instructs the data receivers to track and receive the strongest spread-spectrum RF signals associated with the mobile station. Each data receiver receives a separate RF signal. In particular, each receiver demodulates the RF signal and translates the RF signal to a processed received signal. Each data receiver in the receiver section 320' generates groups of samples 325A', 325B' and 325C', respectively, of the respective processed received signal for each respective detector subsection 400A', 400B' and 400C'.

In the same way as previously described with respect to the single-maxima receiver 300, a demodulator 410' and Walsh transformer circuitry 420' transform groups of samples 325A' of the processed received signal into blocks of complex transformer output signals 425', a block of complex transformer output signals for each group of samples 325A' of the processed received signal. Each block of complex transformer output signals 425' is converted into a group of energy values 445A' by a squaring and summing circuitry 430' in the same way as previously described for the single-maxima receiver 300. Each energy value 445A' within a group of energy values 445A' associated with a group of samples 325A' represents the measure of confidence that the group of samples 325A' of the received signal corresponds to a particular orthogonal code. Since each orthogonal code has a corresponding index symbol, each energy value 445A' within a group of energy values 445A' associated with a group of samples 325A' represents the measure of confidence that the group of samples 325A' of the processed received signal corresponds to a particular index symbol. Similarly, the other fingers generate groups of energy values 445B' and 445C' associated with groups of samples 325B' and 325C' respectively. The groups of energy values 445A'–C' from each finger are carried to the decoder section 605.

Using the summer 500' in the decoder section 605, each group of energy values 445A' is directly added with other groups of energy values 445B'–C' from the other detector subsections 400B'–C' according to their associated orthogonal code (or index symbol) to create a group of combined energy values 505'. The combined energy value 505' for each index symbol is fed into the dual-maxima metric generator 610 which uses a dual-maxima decoding algorithm (which approximates the maximum a posteriori (MAP) decoding algorithm). After acquiring a complete group of combined energy values 505', one combined energy value 505' for each index symbol, the dual-maxima metric generator 610 first searches for the largest combined energy value 505' in a first subset of the group of combined energy values 505' which have associated index symbols having "0" as the first digit. The dual-maxima metric generator then searches for the largest combined energy value 505' in a second subset of the group of combined energy values 505' which have associated index symbols having "1" as a first digit. The difference in the largest combined energy value 505' in the first subset with the largest combined energy value 505' in the second subset is output from the dual-maxima metric generator 610 as the first bit of soft decision data 545' for the first digit of the index symbol corresponding to the most likely orthogonal code. In other words, the first bit in the soft decision data 545' represents a measure of confidence of the value of the first digit of the interleaved data symbol actually sent.

Next, the dual-maxima metric generator searches for the largest combined energy value 505' in a third subset of the group of combined energy values 505' which have associated index symbols having "0" as a second digit and searches for the largest combined energy value 505' in the fourth subset of the group of combined energy values 505' which have associated index symbols having "1" as the second digit. The difference in the largest combined energy values is output as the second bit of soft decision data 545' for the second digit of the index symbol corresponding to the most likely orthogonal code. In other words, the second bit in the soft decision data 545' represents a measure of confidence of the value of the second digit of the interleaved data symbol actually sent.

This process continues until the dual-maxima metric generator 610 generates soft decision data 545' for the last digit in the index symbol most likely sent.

The soft decision data 545' for all the digits of the index symbol most likely sent is then carried to the deinterleaver 550'. The deinterleaver 550' de-interleaves the soft decision data 545' generating deinterleaved soft decision data 555'. The deinterleaved soft decision data 555' is then carried to the decoder 560' (typically a Viterbi decoder) which decodes the deinterleaved soft decision data 555' into estimated digital traffic data bits 565'.

Sometimes the base stations use simple dual-maxima receivers that do not use the rake receiver design. Such receivers only have one finger.

The method used by simple dual-maxima receivers to generate the soft decision data for the $k^{th}$ block of N complex transformer output signals $r_{k,1}, \ldots, r_{k,N}$ can be represented mathematically fairly easily as follows:

$$\Delta_{k,i} = \max\{|r_{k,m}|^2, m \in S_i\} - \max\{|r_{k,m}|^2, m \in \overline{S}\text{hd i}\}, 1i \leq M,$$

where $S_i = \{\in \{1, \ldots N\}, i^{th}$ corresponding bit is "0"], $\overline{S}_i = \{n \in \{1, \ldots, N\}, i^{th}$ corresponding bit is "1"}, $M = \log_2 N$ and $\Delta_{k,i}$ is the $i^{th}$ soft decision bit of the soft decision data associated with the $k^{th}$ block of transformer output signals.

A dual-maxima receiver is described in U.S. Pat. No. 5,442,627 entitle "Non-Coherent Receiver Employing a Dual-Maxima Metric Generation Process" and issued to Qualcomm Incorporated on Aug. 15, 1995. The patent is incorporated by reference herein in its entirety.

Despite the improved bit error performance of the dual-maxima receiver over the single-maxima receiver, there is still a need for an improved receiver with even better bit error performance than that offered by the dual-maxima receiver. Such an improved receiver is needed to increase the system capacity of CDMA communications systems and better utilize the scarce RF spectrum.

SUMMARY OF THE INVENTION

The invention may be summarized according to a first broad aspect as a method of detecting codes carried in a received signal processed into blocks of values. The method includes the steps of arranging the blocks into non-overlapping sets of at least two blocks per set; and for each set, executing a code detection operation over combinations of values, each combination containing one value from each block in the set.

Variations on this broad method include methods where a single- or dual-maxima metric generator is used, methods in which the number of combinations of values is restricted and methods in which the values in a combination are weighted.

In a single-finger, single-maxima embodiment, for example, each combination is associated with a sequence of codes, one code for each block in the set and the code detection operation includes, for each set of blocks: for each combination, summing the values in the combination to produce a summed value; for each summed value, determining the presence of a characteristic therein; identifying the combination having a summed value with the strongest presence of the characteristic; and selecting the sequence of codes associated with the combination so identified.

In a single-finger, dual-maxima embodiment, for example, each combination is associated with a sequence of multi-bit index symbols and the code detection operation includes, for each set of blocks: for each combination, summing the values in the combination to produce a summed value; for each summed value, determining the presence of a characteristic therein.

In addition, for each possible bit position in a multi-bit index symbol: in a subset of combinations consisting of those combinations whose associated multi-bit index symbol has a logical "1" in the bit position, the combination having a summed value with the strongest presence of the characteristic is identified, that combination being a first combination. Furthermore, in a subset of combinations consisting of those combinations whose associated multi-bit index symbol has a logical "0" in the bit position, the combination having a summed value with the strongest presence of the characteristic is identified, that combination being a second combination.

Next, soft decision data is generated based on the multi-bit index symbols and summed values associated with the first and second combination corresponding to each bit position.

When combinations are restricted in the single-finger embodiment, the method includes the further steps of deinterleaving the soft decision data; and decoding the deinterleaved soft decision data into digital traffic data bits.

The combinations may also be weighted on a per-block basis. That is to say, the method includes, prior to the step of summing, for each combination of values, scaling each value in the combination on the basis of the block from which each value originates.

According to another broad aspect, the invention may be summarized as a method of detecting codes carried in a received signal processed into a plurality of streams of blocks of values. The method includes the steps of: for each stream of blocks, arranging the blocks into non-overlapping sets of at least two blocks per set, thereby to produce a respective stream of sets of blocks; combining the values from sets of blocks in different streams to form sets of blocks of combined values; and for each set of blocks of combined values, executing a code detection operation over combinations of combined values, each combination containing one combined value from each block in the set.

The invention can also be summarized as a computer-readable storage medium for executing the steps associated with any of these methods.

According to another broad aspect, the invention may be summarized as a block detection receiver. The receiver is equipped with at least one finger, each finger comprising a unit for processing a received signal to provide sets of non-overlapping blocks of processed values; a unit connected to the fingers, for combining a set of blocks of processed values from each finger into a set of blocks of combined processed values; and a metric generator connected to the combining unit, for executing a code detection operation over combinations of processed values in each set, the combinations having one processed value from each block in the set.

Preferably, the metric generator includes a selection unit operable to identify a subset of combinations among all possible combinations of processed values having one processed value from each block in a set and processing only those combinations so identified.

Preferably, the metric generator includes a weighting unit operable to scale each processed value in a combination of processed values on the basis of the block from which the processed value is taken.

The invention may be summarized according to a further broad aspect as a block detection receiver with a single finger. This receiver includes a transformer for performing block-wise correlations between a received signal and a plurality of codes, thereby to generate blocks of transformed values; a buffer connected to the transformer, for arranging the blocks into a stream of non-overlapping sets of blocks of transformed values of at least two blocks per set; and processing unit connected to the buffer, for executing a code detection operation over combinations of transformed values, each combination containing one transformed value from each block in a set.

According to yet another broad aspect, the invention can be summarized as a block detection receiver equipped with a plurality of transformers for performing block-wise correlations between a received signal and a plurality of codes, thereby to generate blocks of transformed values for each transformer. The receiver also has a plurality of buffers, each buffer connected to a respective transformer, for arranging the blocks received from the respective transformer into a respective stream of non-overlapping sets of blocks of transformed values of at least two blocks per set.

In addition, the receiver has a plurality of energy detectors, each energy detector connected to a respective one of the buffers, for detecting the energy of each transformed value in a set of blocks of transformed values received from the respective buffer and producing a respective set of energy values. The receiver is also equipped with a combining unit connected to the energy detectors, for combining the energy values from each energy detector into a stream of combined energy values. Finally, the receiver has a processing unit connected to the combining unit, for processing the combined energy values and executing a code detection operation over combinations combined energy values, each combination of combined energy values having one combined energy value corresponding to each block in a set.

BRIEF DESCRIPTION OF THE DRAWINGS

A detailed description of the preferred embodiments of the present invention is provided below with reference to the following drawings, in which.

DETAILED DESCRIPTION OF THE PREFERRED EMBODIMENTS

Figure 1:
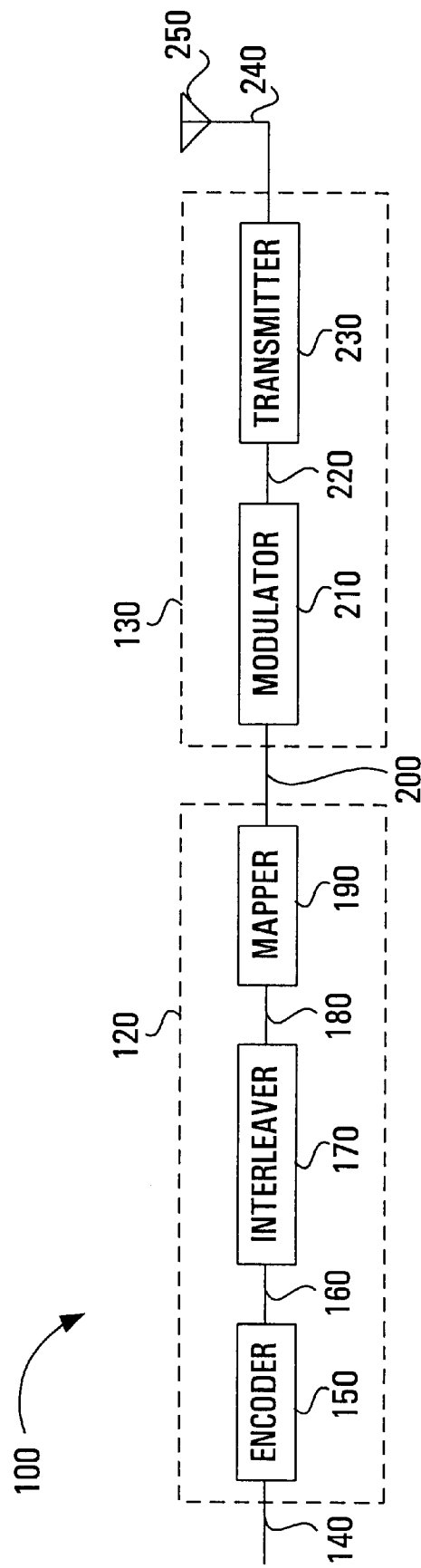
FIG. 1 is a block diagram of a conventional transmitter used by a mobile station in a CDMA communications network.

Referring to FIG. 1, in a conventional CDMA communications system, each mobile station sends traffic typically to the closest base station using a transmitter 100. The transmitter 100 consists of an encoding section 120 and modulating and transmitting section 130. The encoding section 120 is connected to the modulating and transmitting section 130. The transmitter 100 does not send a pilot (or reference) signal.

The encoding section 120 of the transmitter 100 consists of an encoder 150, an interleaver 170 and a mapper 190. The encoder 150 is connected to the interleaver 170 which is connected to the mapper 190. The modulating and transmitting section 130 consists of a modulator 210, a transmitter 230 and an antenna 250. The modulator 210 is connected to the transmitter 230 and the mapper 190. The transmitter 230 is connected to the antenna 250.

The transmitter 100 sends digital traffic comprising traffic digital data bits 140. If the traffic is originally in analog form (i.e. analog traffic), such as voice, then an analog-to-digital (A/D) converter or similar device is first employed to convert the analog traffic to digital traffic (comprising traffic digital data bits 140). The traffic digital data bits 140 are fed into the encoding section 120 of the transmitter 100 typically at 9600 kbits/sec. (Other speeds may be used). In particular, the traffic digital data bits 140 are first fed into the encoder 150 which encodes the traffic digital data bits 140 into data symbols 160 using an encoding algorithm which facilitates the maximum likelihood decoding of the received traffic by the base station serving the mobile station. The encoder 150 typically uses a convolutional encoding algorithm. (Other algorithms may be used such as block coding algorithms). The encoder outputs the data symbols 160 at a fixed encoding rate of one data bit to three data symbols. (Other encoding rates such a one data bit to 2 data symbols may be used). The encoder 150 typically outputs the data symbols 160 at 28.8 ksym/sec (other symbol rates may be used depending on the speed of the traffic digital data bits 140 being fed into the encoder 150 and the encoding rate). The data symbols 160 are fed into the interleaver 170 which block interleaves the data symbols 160 at the symbol level. The interleaver 170 fills a matrix of a predetermined size with the data symbols 160 on a column by column basis. The preferred predetermined size of the matrix is 32 rows by 18 columns (i.e. 576 cells). The size of the matrix depends on the length of a transmission block and the speed of the data symbols 160 sent from the encoder 150. The preferred length of a transmission block is 20 milliseconds (as specified by ANSI standard J-STD-008). Consequently, since the preferred encoder outputs the data symbols 160 at 28.8 ksym/sec, the matrix must hold 576 data symbols 160 (i.e. 28.8 ksym/sec times 20 ms). Hence, a matrix of 32 by 18 is used.

The interleaver 170 outputs interleaved data symbols 180 from the matrix in a row-by-row manner at the same rate the data symbols 160 were inputted in the interleaver 170 (e.g. 28.8 ksym/sec). The interleaved data symbols 180 are fed into the mapper 190. The mapper 190 maps (or encodes) every group of 6 interleaved data symbols 180 into a corresponding Walsh code 200 from a group of 64 Walsh codes 200. Each Walsh code 200 is 64 bits long. (Alternatively, orthogonal codes other than Walsh codes can be used. Furthermore, the mapper 190 may map more or less than six interleaved data symbols 180 into a corresponding orthogonal code depending on the length of the orthogonal codes selected). The mapper 190 outputs the Walsh codes 200 typically at a fixed rate of 307.2 ksymbols/sec. (Alternatively, other symbol rates can be used depending on the rate the interleaver 170 outputs interleaved data symbols 180 and the length of the orthogonal codes used).

A frame of data symbols 160 (or a frame of interleaved data symbols 180) completely fills the matrix of the predetermined size used by the interleaver 170 (i.e. 576 cells in this case). Since the encoder 150 outputs the data symbols 160 at a fixed encoding rate of one data bit to three data symbols, 192 traffic digital data bits 140 are needed. Since every group of 6 interleaved data symbols 180 are mapped into an orthogonal code, every frame of interleaved data symbols 180 is represented by 96 orthogonal codes.

The Walsh codes 200 are fed into the modulating and transmitting section 130 of the transmitter 100. In particular, the Walsh codes 200 are first fed into the modulator 210. The modulator 210 first spreads each Walsh code 200 with a long binary pseudo-random noise (PN) code in order to generate a pseudo-random noise (PN) sequence. Each mobile station is assigned a unique long binary pseudo-random noise (PN) code with which to spread the Walsh code 200. (Alternatively, other long spreading codes may be used other than long binary PN codes). The long binary PN codes not only identify the mobile station but also enhance security by scrambling the traffic. The modulator 210 outputs the PN sequences at a high fixed PN chip rate (typically 1.228 Mchips/sec). The resulting PN sequences help the base station servicing the mobile station to discriminate or detect the RF signals carried on different reverse paths.

The modulator 210 then modulates the PN sequences with a pair of different short spreading codes (of the same length) in order to generate in-phase channel (or I-phase channel) and quadrature phase channel (or Q-phase channel) spread sequences 220.

The I-phase channel and the Q-phase channel spread sequences 220 are then fed into the transmitter 230, where they bi-phase modulate a quadrature pair of sinusoids. The sinusoids are summed and bandpassed limited with a bandpass filter. The bandpassed limited summed sinusoids modulate a RF carrier (which may be amplified) to generate a spread spectrum RF signal 240 which is radiated by the antenna 250.

The spread spectrum RF signal is received by a receiver at the base station. Each base station typically has a plurality of receivers, one for each mobile station to be serviced. The spread spectrum RF signal commonly arrives at the base station servicing the mobile station as a plurality of spread spectrum RF signals travelling on a plurality of different reverse paths.

In a conventional CDMA communications system, the receivers are typically single-maxima or dual-maxima receivers. However, both the single-maxima receiver and the dual-maxima receivers detect one index symbol from the corresponding transformer block (e.g. Walsh block), one Walsh block at a time (i.e. only using the one corresponding transformer block). The performance of the receivers at the base station can be improved significantly by detecting a plurality of index symbols all at once using a respective plurality of transformer blocks (e.g. Walsh blocks).

Figure 5:
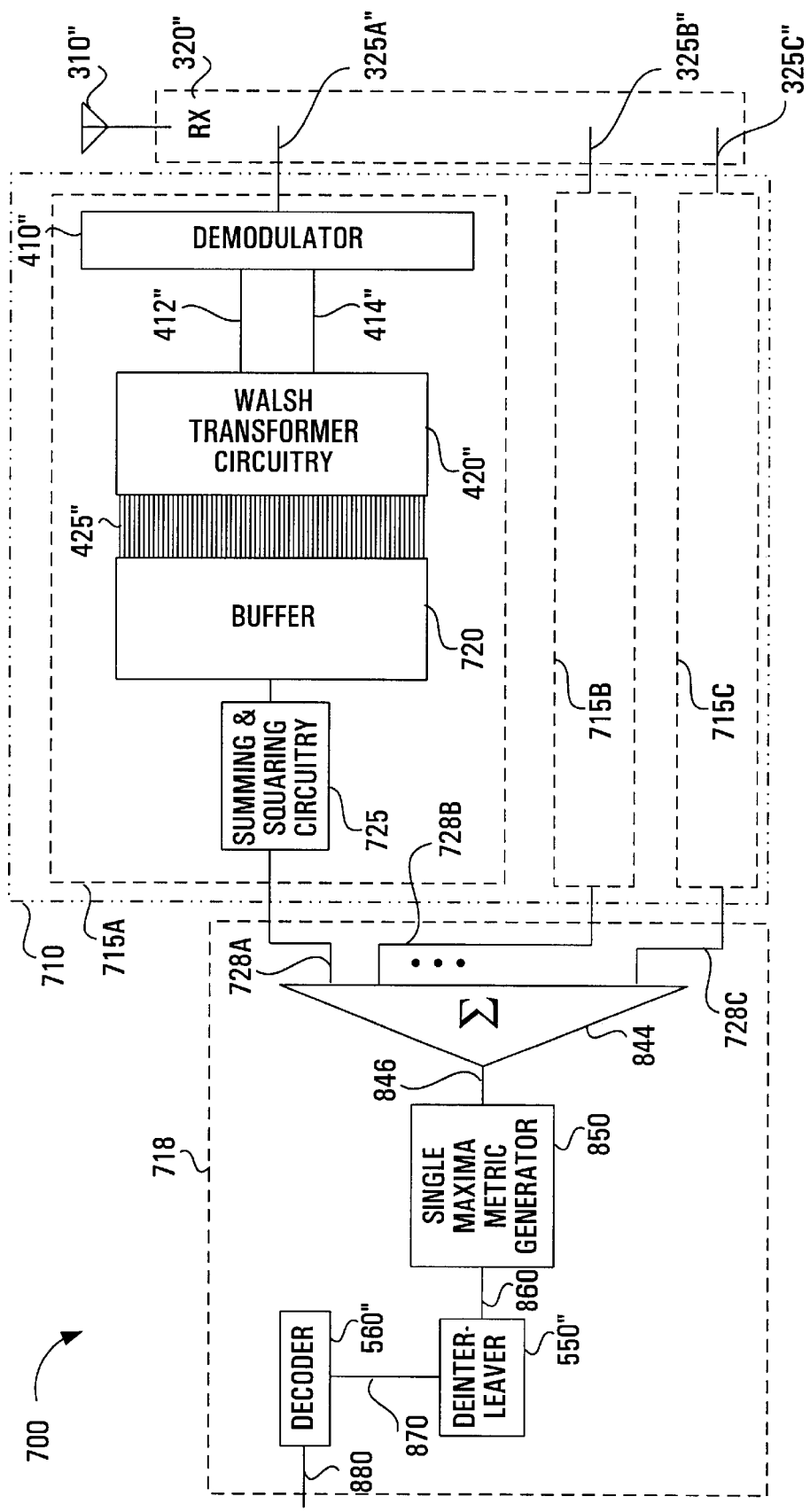
FIG. 5 is a block diagram of a single-maxima block detection receiver used by a base station in accordance with a first preferred embodiment of the present invention.

In accordance with a first preferred embodiment of the present invention, a single-maxima block detection receiver 700 of the rake receiver design is provided. Referring to FIG. 5, the single-maxima block detection receiver 700 consists of an antenna 310", a receiver section 320", a detector section 710, and decoder section 718. (Alternatively, more than one antenna 310" may be used for space or path diversity reception). The receiver section 320" is connected to the antenna 310" and to the detector section 710. The decoder section 718 is connected to the detector section 710.

Figure 2:
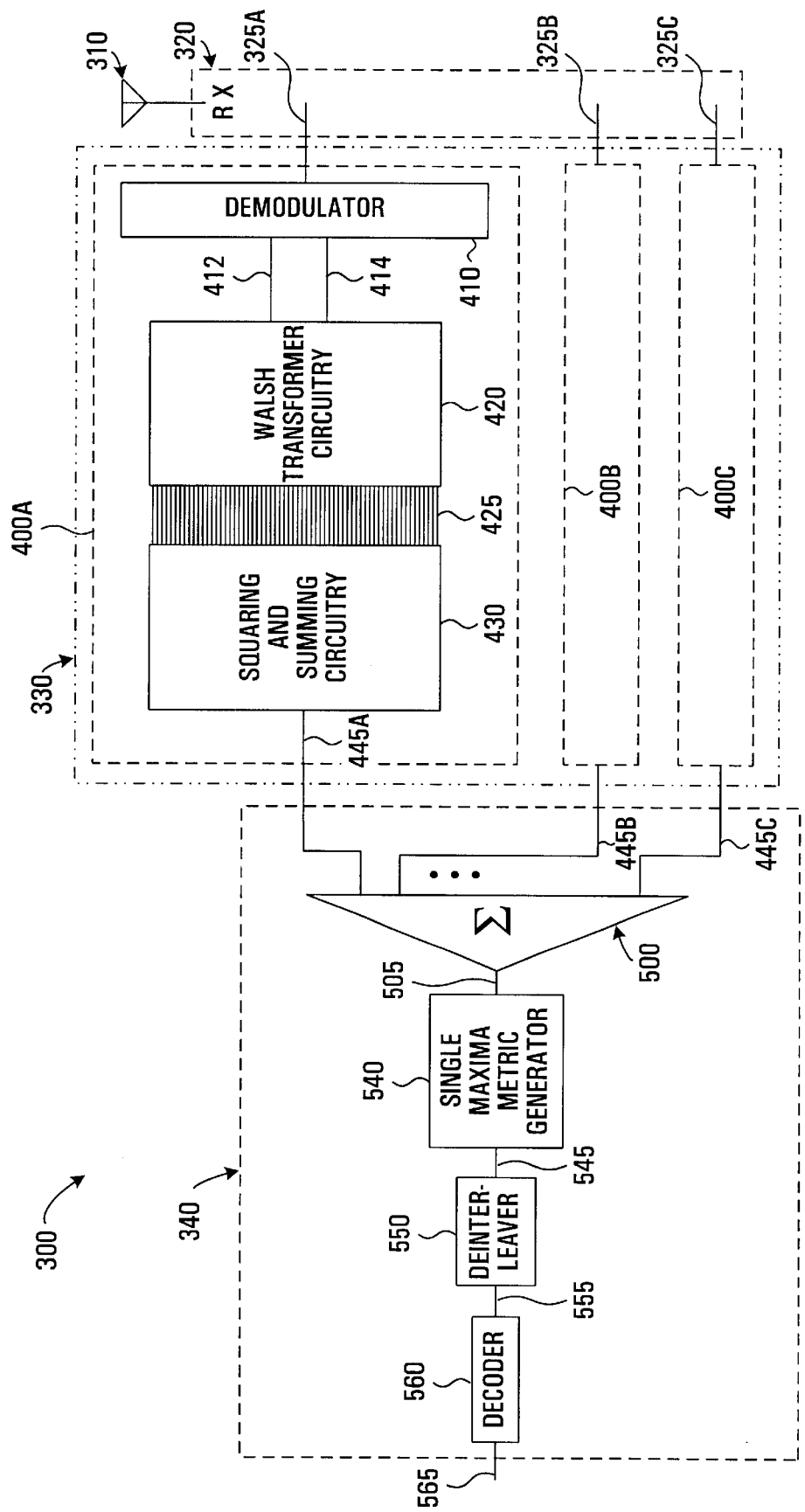
FIG. 2 is a block diagram of a conventional single-maxima receiver used by a base station in a CDMA communications network.

The antenna 310" and the receiver section 320" are identical to the antenna 310 and to the receiver section 320 found in the single-maxima receiver 300 shown in FIG. 2 and operate in exactly the same way.

In particular, the receiver section 320" consists of one receiver subsection. (If more than one antenna 310" is used, multiple receiver subsections would be employed, one for each antenna 310"). Each receiver subsection consists of a searcher receiver and three data receivers. (More or less than three data receivers can be used. However, each receiver section must have one searcher receiver and at least one data receiver). For each RF signal sent by the transmitter 100 of a mobile station, the searcher receiver searches the received spread-spectrum RF signals arriving via the various reverse paths for the strongest spread-spectrum RF signals associated with the transmitter 100 of the mobile station (as identified by the PN code). The searcher receiver then instructs the data receivers to track and receive the RF signals carried in the reverse paths with the strongest levels. Each data receiver typically receives and tracks a separate RF signal. In particular, each data receiver demodulates the respective spread-spectrum RF signal and translates the respective spread-spectrum RF signal from the RF frequency to a respective processed received signal at a lower frequency. Furthermore, each data receiver samples at the PN chip rate (e.g. 1.2288 Msamples/sec) the respective processed received signal to generate respective data samples 325A", 325B" and 325C" for the detector section 710 of the receiver 700.

The detector section 710 consists of three detector subsections 715A, 715B and 715C, one detector subsection 715 for each data receiver in the receiver subsection 320". The number of detector subsections 715 can vary depending on the number of data receivers in the receiver section 320". The combination of the data receiver with its corresponding detector subsection 715A–C is commonly called a finger.

Referring in particular to the first finger, the detector subsection 715A consists of a demodulator 410", a Walsh transformer circuitry 420" and a buffer 720. The Walsh transformer circuitry 420" is connected to the demodulator 410" and to the buffer 720. The buffer 720 is connected to the summing and squaring circuitry 725. The demodulator 410" and the Walsh transformer circuitry 420" are identical to the demodulator 410 and the Walsh transformer circuitry 420 found in the single-maxima receiver 300 and operate in exactly the same way.

In particular, referring to the first finger, data samples 325A" from the first data receiver (which is part of the receiver section 320") are fed into the demodulator 410". The demodulator 410" de-spreads the processed received signal by correlating the processed received signal with the long PN code associated with the mobile station and the short spreading codes. In particular, the demodulator 410" produces samples 412" of the in-phase signal and corresponding samples 414" of the quadrature-phase signal. The samples 412" of the in-phase signal and the samples 414" of the quadrature-phase signal are carried to the Walsh transformer circuitry 420". For every group of 64 samples 412" of the in-phase signal and for every corresponding group of 64 samples 414" of the quadrature phase signal, the Walsh transformer circuitry 420" generates a block of 64 complex transformer output signals 425". (The block may be called a transformer block).

Each block of complex transformer output signals 425" is associated with a complete block of Walsh codes. Furthermore, each complex transformer output signal 425"

is a complex signal. That is, one element of each transformer output signal is the result of a correlation between the samples 412" of the in-phase signal and the corresponding orthogonal code and the other element of the transformer output signal is the result of a correlation between the samples 414" of the quadrature-phase signal and the corresponding orthogonal code. The Walsh transformer circuitry 420" typically includes two Walsh transformers, an example of which is the Fast Hadamard Transformer (FHT). One Walsh transformer is used to generate the elements of the transformer output signal 425" associated with the in-phase signal; the other Walsh transformer is used to generate the elements of the transformer output signal 425" associated with the quadrature signal.

Each block of transformer output signals 425" is carried from the Walsh transformer circuitry 420" to the buffer 720 in parallel fashion. (Alternatively, each transformer output signal in a transformer block may be carried to the buffer 720 serially). The buffer 720 buffers three blocks of transformer output signals 425". (Alternatively, more or less than three blocks of transformer output signals 425" may be buffered; however, at least two blocks must be buffered). The three transformer blocks may be called a set of transformer blocks.

When the buffer 720 is full (i.e. contains three blocks of transformer output signals 425"), all the blocks of transformer output signals 425" in the buffer 720 (i.e. associated with the three blocks of Walsh codes) are carried to the summing and squaring circuitry 725 (typically in a parallel fashion).

The summing and squaring circuitry 725 adds together one transformer output signal from each transformer block in every possible combination to generate a group of summed signals. In this case, since 3 transformer blocks are used, each transformer block having 64 transformer signals, the summing and squaring circuitry will generate 262,144 possible combinations (64×64×64).

Each summed signal in the group of summed signals is complex-valued. The summary and squaring circuitry 725 computes the square modulus of these complex values to generate a group of decision values (or energy values) 728A. Similarly, the other fingers generate groups of decision values (or energy values) 728B–C associated with groups of samples 325B" and 325C". It is noted that squaring the real and imaginary parts of the transformer output signal is not achieved until after a multiplicity of consecutive transformer output signals have been added together.

The decision values (or energy values) 728A, 728B and 728C from each finger are carried to the decoder section 718.

The decoder section 718 consists of a summer 844, a single-maxima metric generator 850, a de-interleaver 550", and a decoder 560". The single-maxima metric generator 850 is connected to the summer 844 and to the deinterleaver 550".

The summer 844 is connected to each detector subsection 715A–C.

The deinterleaver 550" is connected to the decoder 560".

Figure 6:
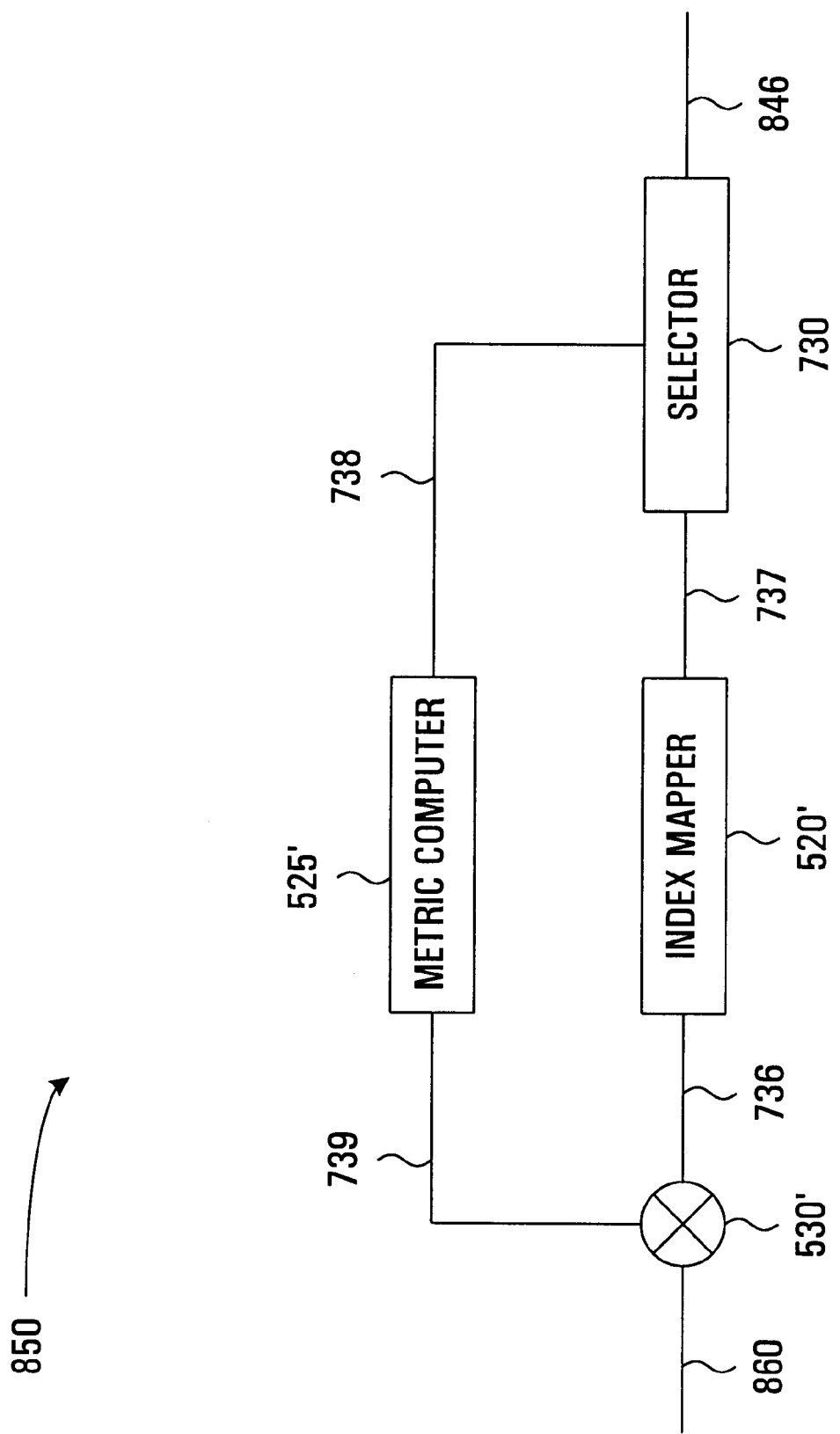
FIG. 6 is a block diagram of a single-maxima metric generator used by the single-maxima block detection receiver shown in FIG. 5.

Referring in particular to FIG. 6, the single-maxima metric generator 850 consists of a selector 730, an index mapper 520', a metric computer 525' and a multiplier 530'. The selector 730 is connected to the metric computer 525' and to the index mapper 520'. The metric computer 525' and the index mapper 520' are connected to the multiplier 530'. The metric computer 525', the index mapper 520' and the multiplier 530' are identical to the metric computer 525, the index mapper 520 and the multiplier 530 in the single-maxima receiver 300 shown in FIG. 3 and operate in exactly the same way.

In operation, therefore, the decision values 728A, 728B and 728C in each group of decision values are directly added together according to their associated orthogonal codes (or index symbols) by the summer 844 to generate a group of combined decision values 846. For example, the decision value from a finger comprising the square modulus of the sum of the first row, fifth and eighteenth row of the transformer blocks is added with decision values each comprising the square modulus of the sum of the first row, fifth and eighteenth row of the transformer blocks) from the two other fingers and so on.

Figure 3:
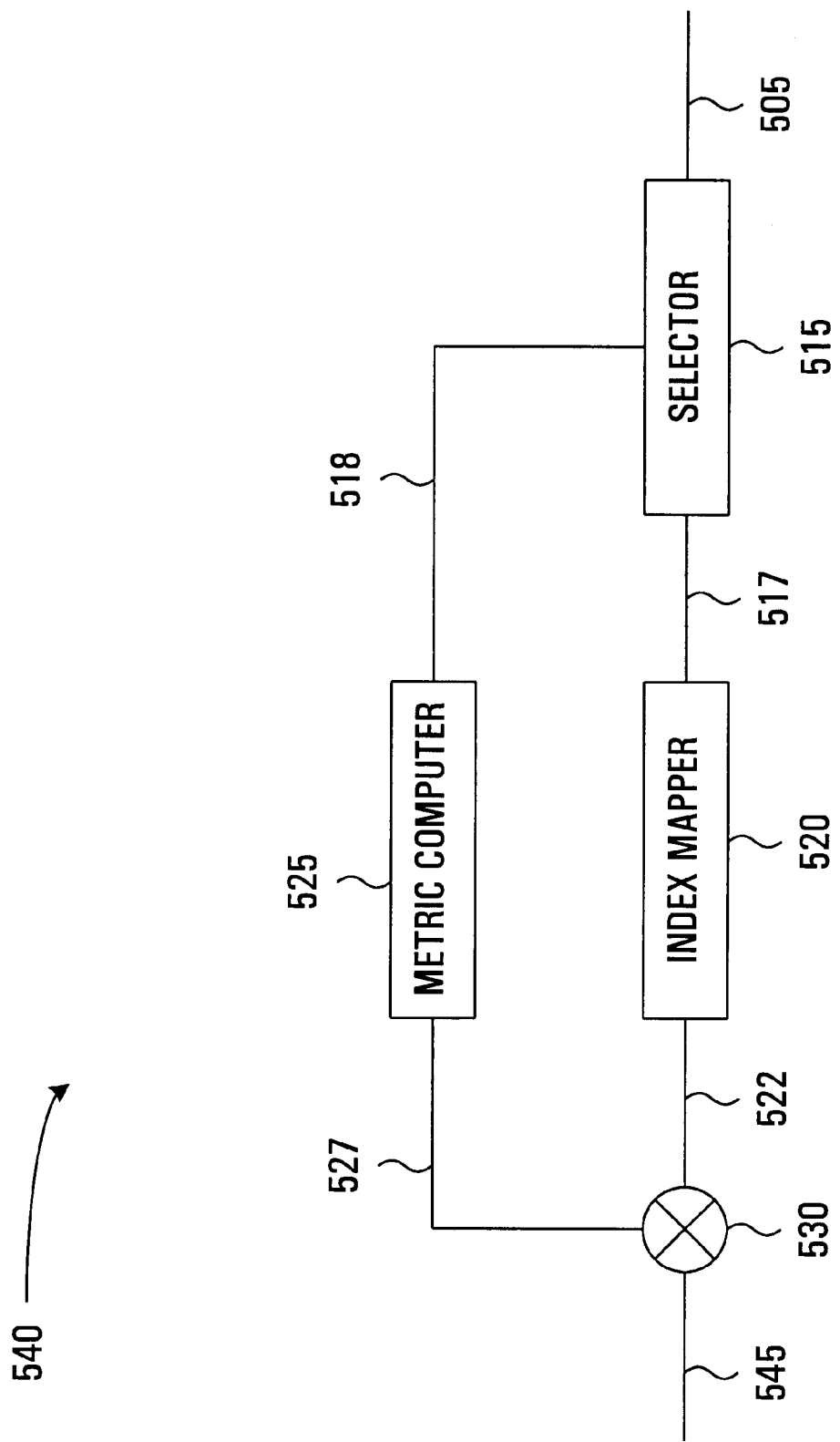
FIG. 3 is a block diagram of a single-maxima metric generator used by a single-maxima receiver shown in FIG. 2.

The combined decision values 846 are then carried to the single-maxima metric generator 850 which operates similarly to the single-maxima metric generator 540 found in the single-maxima receiver 300 shown in FIG. 2 and 3. The selector 730 then selects the largest combined decision value 738 from the group of combined decision values 846 which is carried to the metric computer 525'. The metric computer 525' then scales the largest combined decision value 738 to generate a scaling factor 739.

The largest combined decision value 738 is the energy of the sum of three complex transformer output signals, one from each block of complex transformer output signals. Each transformer output signal has a corresponding index symbol 737. The three corresponding index symbols 737 are carried from the selector 730 to the index mapper 520'. It should be noted that the summing and squaring circuitry 725 need not generate and send to the selector 730 via the summer 844, the index symbols associated with the largest decision value 738 when the combined decision values 846 relating to the index symbols are presented to the selector 730 in a predetermined order.

The index mapper 520' maps each of the three index symbols into a plurality of "1" and "−1" soft decision bits 736. The soft decision bits 736 for each of the three index symbols and a scaling factor 739 are carried to the multiplier 530' which multiplies each of the soft decision bits 736 for each of the three index symbols by the scaling factor 739 to generate soft decision data 860 for each of the three index symbols 737.

In particular, soft decision data 860 for each index symbol comprises six bits. The first bit of the soft decision data 860 for a particular index symbol represents a measure of confidence of the value of the first digit of the particular index symbol. In other words, the first bit of the soft decision data 860 for the first digit of a particular index symbol represents a measure of confidence of the value of the first digit of the respective interleaved data symbol 180 originally sent. The second bit of the soft decision data 860 for the second digit of a particular index symbol represents a measure of confidence of the value of the second digit of the particular index symbol, etc.

The soft decision data 860 is carried to the deinterleaver 550".

Using the same process as described above, more soft decision data 860 is generated from the next set of transformer blocks, and so on. The next set of transformer blocks is the set of transformer blocks containing as the first transformer block, the transformer block immediately following the last transformer block used in the previous set of transformer blocks. In other words, none of the sets of transformer blocks contain transformer blocks from another set. For instance, if the 3 rd, 4 th and 5 th transformer blocks are first used to generate soft decision data 860 then the 6 th, 7 th and 8 th transformer blocks are used to generate more soft decision data 860.

The deinterleaver 550" deinterleaves the soft decision data 860 and generates the interleaved soft decision data 870. In particular, the soft decision data 860 is input to a matrix of the pre-determined size (e.g., 18 by 32) in a row-by-row manner. The deinterleaved soft decision data 870 is output from the matrix of the predetermined size in a column-by-column manner. The deinterleaved soft decision data 870 is output by the deinterleaver 550" at the same speed that the soft decision data 860 was input to the deinterleaver 550" (e.g. 28.8 kmetrics/sec).

The deinterleaved soft decision data 870 is then carried from the de-interleaver 550" to the decoder 560" which utilizes maximum likelihood decoding techniques to estimate digital traffic data bits 880. Typically, the decoder 560" is a Viterbi decoder.

By buffering blocks of transformer output signals 425" and by selecting the largest decision value 738, the signal-to-noise ratio is increased, thereby providing better bit error performance.

Alternatively, the rake receiver design need not be used. A simple single-maxima block detection receiver simply uses one finger.

For the $k^{th}$ set of transformer blocks, the method used by the block detection receiver to determine the largest combined decision value (or largest energy value) can be described mathematically fairly easily as follows:

Largest Energy Value 738=$\max|r_{3k,j}+r_{3k+1,m}+r_{3k+2,n}|^2$, $1 \leq j,m,n \leq 64$ where $r_{3k,j}$ ($1 \leq j \leq 64$) are the 64 transformer output signals for the $3k^{th}$ transformer block, $r_{3k+1,m}$ ($1 \leq m \leq 64$) are the 64 transformer output signals for the $3k+1^{th}$ transformer block and $r_{3k+2,n}$ ($1 \leq n \leq 64$) are the 64 transformer output signals for the $3k+2^{th}$ transformer block.

Figure 7:
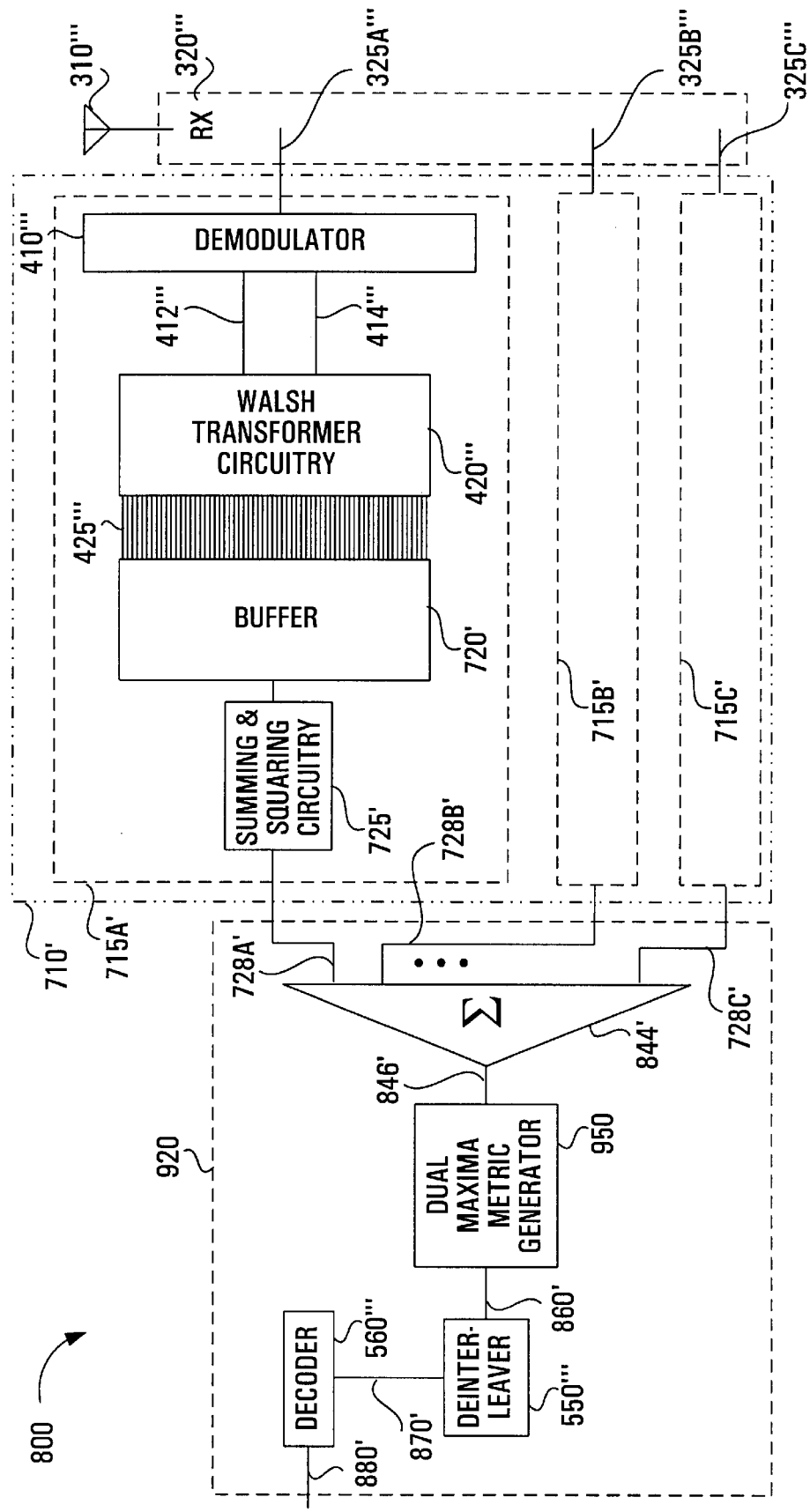
FIG. 7 is a block diagram of an dual-maxima block detection receiver used by a base station in accordance with a second preferred embodiment of the present invention.

In accordance with a second preferred embodiment of the present invention, there is provided a dual-maxima block detection receiver 800 with three fingers. Referring to FIG. 7, the dual-maxima block detection receiver 800 consists of a receiver section 320''', a detector section 710' and a decoder section 920. The receiver section 320''' is connected to the detector section 710'. The detector section 710' is connected to the decoder section 920.

The receiver section 320''' has a searcher receiver and three data receivers. The receiver section 320''' is identical to the receiver section 320' in the dual-maxima receiver 600 shown in FIG. 4 and operates in exactly the same way. That is, each data receiver in the receiver section 320''' provides groups of samples 325A''', 325B''' and 325C''' of the respective processed received signal to the detector section 710'.

The detector section 710' is the same as the detector section 710 used in the single-maxima block detection receiver 700 and operates the same way. The detector section 710' consists of three detector subsections 715A', 715B' and 715C', one for each finger. The detector subsections 715A', 715B' and 715C' are identical to the detector subsections 715A, 715B and 715C used in the single-maxima block detection receiver 700 and operate in exactly the same way. The number of detector subsections 715' can vary depending on the number of data receivers in the receiver section 320'''. As mentioned earlier, the combination of the data receiver with its corresponding detector subsection 715A', 715B', 715C' is commonly called a finger. Each data receiver provides samples 325A''', 325B''', 325C''' of the processed received signals to the respective detector subsections 715A', 715B', 715C'.

Each detector subsection 715A'–C' consists of the demodulator 410''', the Walsh transformer circuitry 420''', the buffer 720' and the summing and squaring circuitry 725'. The Walsh transformer circuitry 420''' is connected to the demodulator 410''' and to the buffer 720'. The buffer 720' is connected to the summing and squaring circuitry 725'.

The demodulator 410''', the Walsh transformer circuitry 420''', the buffer 720' and the summing and squaring circuitry 725' are identical to the demodulator 410" the Walsh transformer circuitry 420", the buffer 720 and the summary and squaring circuitry 725 in the single-maxima block detection receiver 700 and operate in exactly the same way as described for the single-maxima block detection receiver 700 shown in FIG. 5. In particular, referring to the first finger, groups of data samples 325A''' of the processed received signal are transformed into blocks of transformer output signals 425'''. Each block of transformer output signals 425''' is associated with a complete block of Walsh codes. Each block of transformer output signals 425''' is carried from the Walsh transformer circuitry 420''' to the buffer 720'. The buffer 720' buffers three blocks of transformer output signals 425'''. Alternatively, more or less than three blocks of transformer output signals 425''' may be buffered; however, at least two blocks of transformer output signals 425''' must be buffered.

When the buffer 720' is full (i.e. contains three blocks of transformer output signals 425'), all the blocks of transformer output signals 425''' in the buffer 720' (i.e. associated with three blocks of Walsh codes) are carried to the summing and squaring circuitry 725'.

The summing and squaring circuitry 725' adds together one transformer output signal from each transformer block in every possible combination to generate a group of summed signals. In this case, since three transformer blocks are used, each containing 64 transformer output signals, there are 262,264 possible combinations (i.e., 64×64×64) The summing and squaring circuitry 725' then finds the square (or another monotonic function) of the modulus of each summed signal in the group of summed signals to generate a group of decision values (or energy values) 728A'. Similarly, the other fingers generate groups of decision values (or energy values) 728B'–C'. Each group of decision values 728A', 728B' and 728C' from each finger is carried to the decoder section 920.

The decoder section 920 consists of a summer 844', a dual-maxima metric generator 950, a deinterleaver 550''' and a decoder 560'''. The dual-maxima metric generator 950 is connected to the summer 844' and to the deinterleaver 550'''. The deinterleaver 550''' is connected to the decoder 560'''. The summer 844' is also connected to each detector subsection 715A'–C'. The summer 844', the deinterleaver 550''' and the decoder 560''' are identical to the summer 844, the deinterleaver 550" and the decoder 860" found in the single-maxima block detection receiver 700 shown in FIG. 5 and operate in exactly the same way.

In operation, the decision values 728A', 728B' and 728C' in each group of decision values 728A'–C' are directly added together according to their associated combination of orthogonal codes (or index symbols) by the summer 844' to generate a group of combined decision values 846'. For instance, the decision value from a finger comprising the square modulus of the sum of the first row, fifth and eighteenth row of the transformer blocks is added with squared summed signals (each comprising the square modulus of the sum of the first row, fifth and eighteenth row of the transformer blocks) from the two other fingers, and so on.

Figure 4:
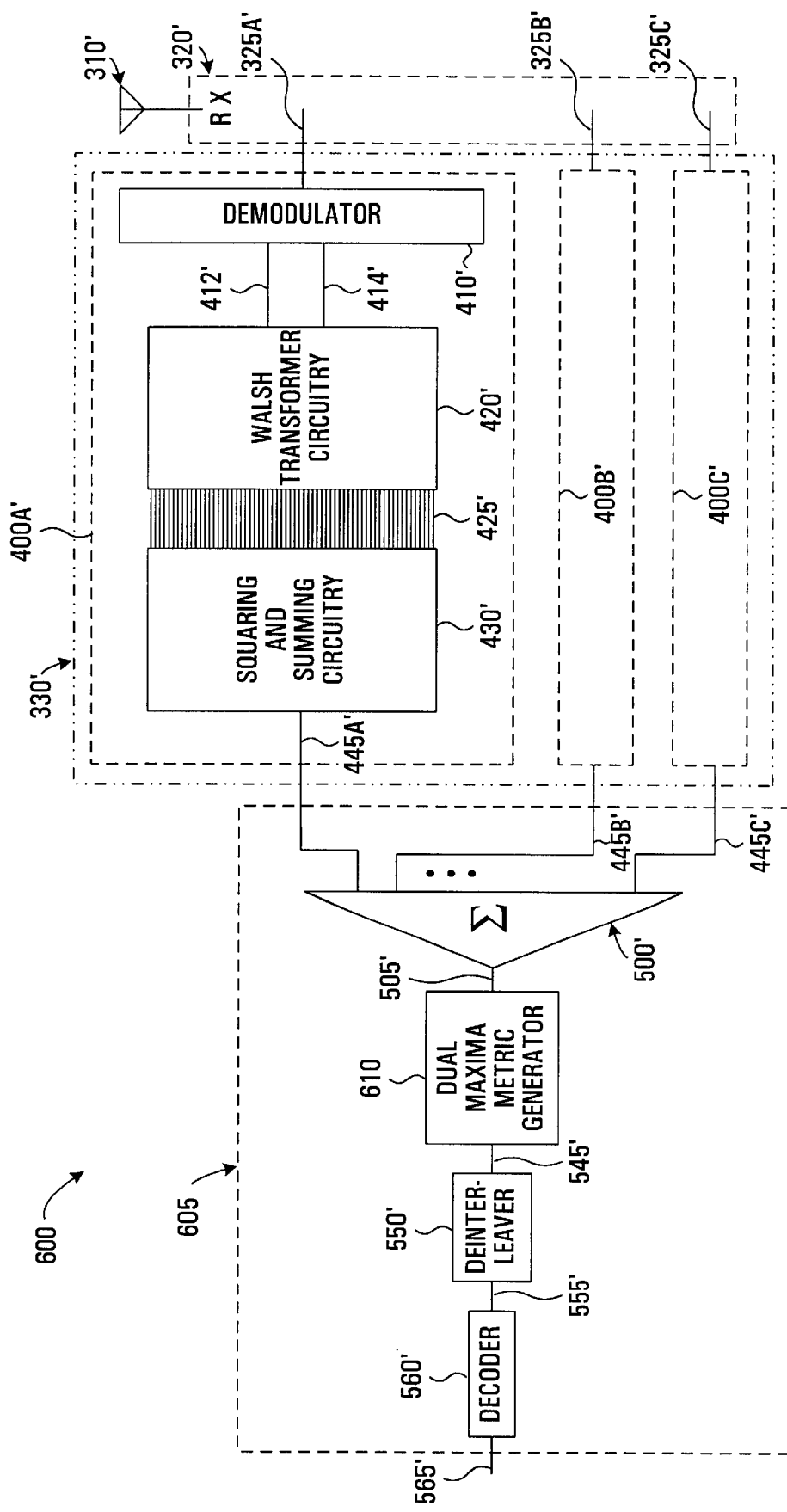
FIG. 4 is a block diagram of a conventional dual-maxima receiver used by a base station in a CDMA communications network.

The combined decision values 846' are then carried to the dual-maxima metric generator 950 which operates in a similar way to the dual-maxima metric generator 610 found in the dual-maxima receiver 600 shown in FIG. 4. After acquiring a complete group of combined decision values 846', the dual-maxima metric generator 950 first searches for the largest combined decision value 846' in a first subset of the combined decision values 846' which have associated index symbols associated with the first transformer block having "0" as the first digit. The dual-maxima metric generator 950 then searches for the largest combined decision value 846' in a second subset of the set of combined decision values 846' which have associated index symbols associated with the first transformer block having "1" as a first digit. The difference between the largest combined decision value 846' in the first subset and the largest combined decision value 846' in the second subset is output from the dual-maxima metric generator 950 as soft decision data 860' for the first digit of the index symbol corresponding to the orthogonal code most likely sent and associated with the first transformer block. The soft decision data 860' for first digit of the index symbol thus represents a measure of confidence of the value of the first digit of the particular index symbol. In other words, the soft decision data 860' for the first digit of the index symbol represents a measure of confidence of the value of the first digit of the respective interleaved data symbol 180 originally sent.

Next, the dual-maxima metric generator 950 searches for the largest combined decision value 846' in a third subset of the set of combined decision values 846' which have associated index symbols associated with the first transformer block having "0" as a second digit and searches for the largest combined decision value 846' in a fourth subset of the set of combined decision values 846' which have associated index symbols associated with the first transformer block having "1"as a second digit. The difference in the largest combined decision values 846' is output as soft decision data 860' for the second digit of the index symbol corresponding to the orthogonal code most likely sent and associated with the first transformer block. The soft decision data 860' for the second digit of the index symbol thus represents a measure of confidence of the value of the second digit of the index symbol corresponding to the orthogonal code most likely sent. In other words, the soft decision data 860' for the second digit of the index symbol represents a measure of confidence of the value of the second digit of the respective interleaved data symbol 180 originally sent.

This process continues until the dual-maxima metric generator 950 generates soft decision data 860' for the last digit in the index symbol corresponding to the orthogonal code most likely sent and associated with the first transformer block.

After the dual-maxima metric generator 950 generates soft decision data 860' for the last digit in the index symbol for the first transformer block, then the dual-maxima metric generator 950 generates soft decision data 860' for each digit in the index symbol corresponding to the orthogonal code most likely sent and associated with the second transformer block in the same way. In other words, the dual-maxima metric generator 950 generates soft decision data 860' for each digit in the respective interleaved data symbol 180.

More specifically, the dual-maxima metric generator 950 first searches for the largest combined decision value 846' in a first subset of the combined decision values 846' which have associated index symbols associated with the second transformer block having "0" as the first digit. The dual-maxima metric generators 950 then searches for the largest combined decision value 846' in a second subset of the set of combined decision values 846' which have associated index symbols associated with the second transformer block having "1" as a first digit. The difference between the largest combined decision value 846' in the first subset and the largest combined decision value 846' in the second subset is output from the dual-maxima metric generator 950 as soft decision data 860' for the first digit of the index symbol of the orthogonal code most likely sent and associated with the second transformer block.

Next, the dual-maxima metric generator 950 searches for the largest combined decision value 846' in a third subset of the set of combined decision values 846' which have associated index symbols associated with the second transformer block having "0" as a second digit and searches for the largest combined decision value 846' in a fourth subset of the set of combined decision values 846' which have associated index symbols associated with the second transformer block having "1" as a second digit. The difference in the largest combined decision values 846' is output as soft decision data 860' for the second digit of the index symbol corresponding to the orthogonal code most likely sent and associated with the second transformer block.

This process continues until the dual-maxima metric generator 950 soft decision data 860' for the last digit in the index symbol corresponding to the orthogonal code most likely sent and associated with the second transformer block.

Using the same method, the dual-maxima metric generator 950 generates soft decision data 860' for all the digits of the index symbol corresponding to the orthogonal code most likely sent and associated with the third transformer block.

The process described above is repeated to produce more soft decision data 860' associated with the next set of transformer blocks, and so on. The next set of transformer mi blocks is the set of transformer blocks containing as the first transformer block, the transformer block immediately following the last transformer block used in the previous set of transformer blocks. In other words, none of the sets of transformer blocks contain transformer blocks from another set.

The soft decision data 860' is carried from the dual-maxima metric generator 950 to the deinterleaver 550'''. The deinterleaver 550''' deinterleaves the soft decision data 860' and generates the interleaved soft decision data 870'. In particular, the soft decision data 860' is input to a matrix of the predetermined size in a row-by-row manner. The deinterleaved soft decision data 870' is output from the matrix of the predetermined size in a column-by-column manner. The deinterleaved soft decision data 870' is outputted by the deinterleaver 550''' at the same speed that the soft decision data 860' was inputted into a deinterleaver 550''' (e.g. 28.8 kmetrics/sec).

The interleaved soft decision data 870' is then carried from the deinterleaver 550''' to decoder 560''' which utilizes maximum likelihood decoding techniques to estimate digital traffic data bits 880'. Preferably, the decoder 560''' is a Viterbi decoder.

Alternatively, the rake receiver design need not be used. A simple dual-maxima block detection receiver simply uses one finger.

The method used by the dual-maxima block detection receiver of FIG. 7 to generate the soft decision data associated with the $k^{th}$ transformer block, the $k+1^{th}$ transformer block and the $k+2^{th}$ transformer block may be represented mathematically fairly easily as follows:

$$\Delta_i = \max\{|r_{3k,j} + r_{3k+1,m} + r_{3k+2,n}|^2, j, m, n \in S_i\} -$$

$$\max\{|r_{3k,j} + r_{3k+1,m} + r_{3k+2,n}|^2, j, m, n \in \overline{S_i}\}$$

where $S_i=\{1 \leq j,m,n \leq 64: i^{th}$ corresponding bit is "0"$\}$; $\overline{S_i}=\{1 \leq j,m,n \leq 64: i^{th}$ corresponding bit is "1"$\}$ and where $1 \leq i \leq 18$.

It is noted that $\Delta_i$, where $1 \leq i \leq 6$, is the soft decision data associated with the first transformer block; $\Delta_i$, where $7 \leq i \leq 12$, is the soft decision data associated with the second transformer block; and $\Delta_i$, where $13 \leq i \leq 18$, is the soft decision data associated with the third transformer block.

Since the multiple block detection approach can be considered as a form of sequence estimation, the performance of a block detection receiver, such as either of the block detection receivers described in the first and second preferred embodiments, is close to that of coherent detection and is much better than that of the conventional single-maxima receiver and the conventional dual-maxima receiver.

In accordance with a third preferred embodiment of the present invention, there is provided a single-maxima block detection receiver which is identical to the single-maxima block detection receiver 700 shown in FIG. 5 with the exception that the summing and squaring circuitry 725 is replaced with weighted summing and squaring circuitry.

As before, each block of transformer output signals 425" is carried from the Walsh transformer circuitry 420''' to the buffer 720 in parallel fashion. (Alternatively, each transformer output signal in a transformer block may be carried to the buffer 720 serially). The buffer 720 buffers three blocks of transformer output signals 425". (Alternatively, more or less than three blocks of transformer output signals 425" may be buffered; however, at least two blocks must be buffered). The three transformer blocks may be called a set of transformer blocks.

When the buffer 720 is full (i.e. contains three blocks of transformer output signals 425"), all the blocks of transformer output signals 425" in the buffer 720 are carried to the weighted summing and squaring circuitry, typically in a parallel fashion.

The weighted summing and squaring circuitry multiplies all the transformer output signals 425" in the first block of transformer output signals 425" by a first weight, multiplies all the transformer output signals 425" in the second block of transformer output signals 425" by a second weight and multiplies all the transformer output signals 425" in the third block of transformer output signals 425" by a third weight. A transformer output signal 425" multiplied by the first, second or third weight may be called a weighted transformer output signal.

The weighted summing and squaring circuitry adds together one weighted transformer output signal from each transformer block in every possible combination to generate a group of weighted summed signals. In this case, since 3 transformer blocks are used, each transformer block having 64 transformer signals, the weighted summing and squaring circuitry will generate 262,144 possible combinations (64× 64×64).

The weighted summing and squaring circuitry then finds the square modulus (or another monotonic function) of each complex-valued weighted summed signal in the group of weighted summed signals to generate a group of decision values (or energy values) 728A. Similarly, the other fingers generate groups of decision values (or energy values) 728B–C associated with groups of samples 325B" and 325C".

The decision values (or energy values) 728A, 728B and 728C from each finger are carried to the decoder section 718 which operates as previously described.

The first, second and third weights can be predetermined through computer simulation. In the preferred embodiment, the first weight is 0.9, the second weight is 1.0 and the third weight is 0.9.

Alternatively, the rake receiver design need not be used. A single-maxima block detection receiver can be used which has only one finger.

For the kth set of transformer blocks, the method used by the just described block detection receiver to determine the largest combined decision value (or largest energy value) can be described mathematically fairly easily as follows:

Largest Energy Value 738=$\max|C1^*r_{3k,j}+C2^*r_{3k+1,m}+C3^*r_{3k+2,n}|^2$, $1 \leq j,m,n \leq 64$ where $r_{3k,j}$ ($1 \leq j \leq 64$) are the 64 transformer output signals for the $3k^{th}$ transformer block, $r_{3k+1,m}$ ($1 \leq m \leq 64$) are the 64 transformer output signals for the $3k+1^{th}$ transformer block, $r_{3k+2,n}$ ($1 \leq n \leq 64$) are the 64 transformer output signals for the $3k+2^{th}$ transformer block and C1, C2 and C3 are the first, second and third weights respectively.

In accordance with a fourth preferred embodiment of the present invention, there is provided a dual-maxima block detection receiver which is identical to the dual-maxima block detection receiver 800 shown in FIG. 7 with the exception that the summing and squaring circuitry 725' is replaced with weighted summing and squaring circuitry.

As before, each block of transformer output signals 425''' is carried from the Walsh transformer circuitry 420''' to the buffer 720'. The buffer 720' buffers three blocks of transformer output signals 425''', each block of transformer output signals 425''' being associated with a complete block of Walsh codes. Alternatively, more or less than three blocks of transformer output signals 425''' may be buffered; however at least two blocks of transformer output signals 425''' must be buffered.

When the buffer 720' is full (i.e. contains three blocks of transformer output signals 425'), all the blocks of transformer output signals 425''' in the buffer 720' are carried to the weighted summing and squaring circuitry.

The weighted summing and squaring circuitry multiplies all the transformer output signals 425''' in the first block of transformer output signals 425''' by a first weight, multiplies all the transformer output signals 425''' in the second block of transformer output signals 425''' by a second weight and multiplies all the transformer output signals 425''' in the third block of transformer output signals 425''' by a third weight. A transformer output signal 425''' multiplied by the first, second or third weight may be called a weighted transformer output signal.

The weighted summing and squaring circuitry adds together one weighted transformer output signal from each transformer block in every possible combination to generate a group of weighted summed signals. In this case, since 3 transformer blocks are used, each transformer block having 64 transformer signals, the weighted summing and squaring circuitry will generate 262,144 possible combinations (64× 64×64).

The weighted summary and squaring circuitry then finds the square of the magnitude (i.e., the energy of) each complex-valued weighted summed signal in the group of weighted summed signals to generate a group of decision values (or energy values) 728A'. Similarly, the other fingers generate groups of decision values (or energy values) 728B'–C'. Each group of decision values 728A', 728B' and 728C' from each finger is carried to the decoder section 920 which operates as previously described.

Alternatively, the rake receiver design need not be used. A dual-maxima block detection receiver can be used which simply uses one finger.

The method used by the just described dual-maxima block detection receiver to generate the soft decision data associated with the kth transformer block, the k+1$^{th}$ transformer block and the k+2$^{th}$ transformer block may be represented mathematically fairly easily as follows:

$$\Delta_i = \max\{|C1 * r_{3k,j} + C2 * r_{3k+1,m} + C3 * r_{3k+2,n}|^2, j, m, n \in S_i\} -$$
$$\max\{|C1 * r_{3k,j} + C2 * r_{3k+1,m} + C3 * r_{3k+2,n}|^2, j, m, n \in \overline{S_i}\},$$

where:

$r_{q,p}$ is the p$^{th}$ transformer output signal for the q$^{th}$ transformer block;

$S_i$={all j,m,n: i$^{th}$ corresponding bit is "0", $1 \leq i \leq 18$};

$S_i$={all j,m,n: i$^{th}$ corresponding bit is "1", $1 \leq i \leq 18$}; and

C1, C2 and C3 are the first, second and third weights respectively.

It is noted that $\Delta_i$, where $1 \leq i \leq 6$, is the soft decision data associated with the first transformer block; $\Delta_i$, where $7 \leq i \leq 12$, is the soft decision data associated with the second transformer block; and $\Delta_i$, where $13 \leq i \leq 18$, is the soft decision data associated with the third transformer block.

While the above-described embodiments determine the most likely combination of Walsh codes transmitted by the transmitter over a plurality of blocks, it requires the processing of a very large number of combinations. It is possible to envisage an implementation which is somewhat less computationally intensive but still provides good detection performance. The driving assumption behind the design of a reduced complexity block detection receiver is that a code with a high energy value in a particular block in a set has an above-average chance of being among the codes actually transmitted for that set.

Figure 8:
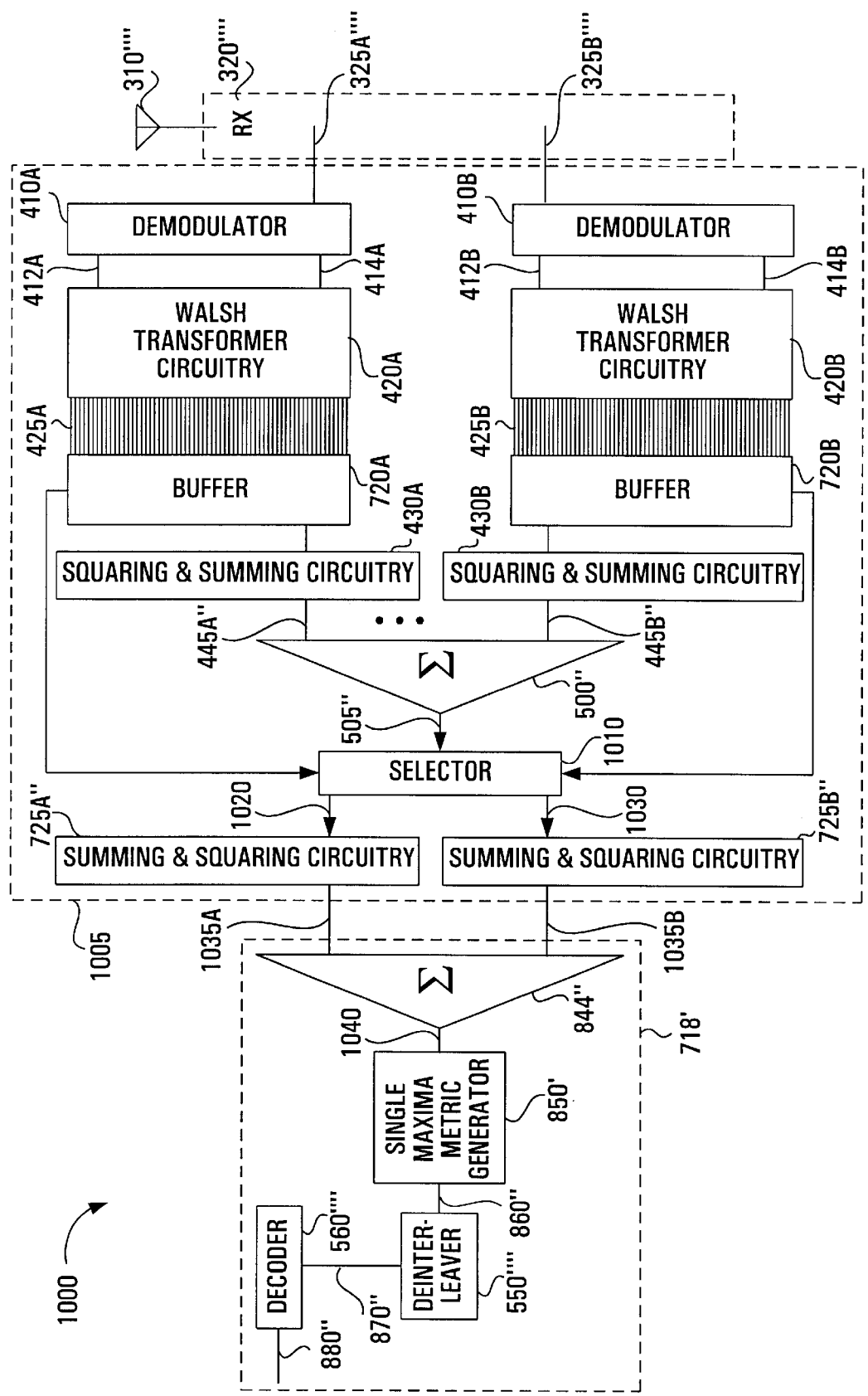
FIG. 8 is a block diagram of a block detection receiver used by a base station in accordance with a fifth preferred embodiment of the present invention.

Therefore, in accordance with a fifth preferred embodiment, FIG. 8 shows a block detection receiver 1000 which utilizes a reduced complexity algorithm. The block detection receiver 1000 comprises an antenna 310"", a receiver section 320"", a detector section 1005 and a decoder section 718'. (Alternatively, more than one antenna 310"" may be used for space or path diversity reception). The receiver section 320"" is connected to the antenna 310"" and to the detector section 1005. The decoder section 718' is connected to the detector section 1005.

In particular, the receiver section 320"" consists of one receiver subsection. (If more than one antenna 310"" is used, multiple receiver subsections would be employed, one for each antenna 310""). Each receiver subsection consists of a searcher receiver and two data receivers. (Alternatively, more than two data receivers can be used.) For each RF signal sent by the transmitter 100 of a mobile station, the searcher receiver searches the received spread-spectrum RF signals arriving via the various reverse paths for the strongest spread-spectrum RF signals associated with the transmitter 100 of the mobile station (as identified by the PN code). The searcher receiver then instructs the data receivers to track and receive the RF signals carried in the reverse paths with the strongest levels. Each data receiver typically receives and tracks a separate RF signal. In particular, each data receiver demodulates the respective spread-spectrum RF signal and translates the respective spread-spectrum RF signal from the RF frequency to a respective processed received signal at a lower frequency. Furthermore, each data receiver samples the respective processed received signal at the PN chip rate (e.g. 1.2288 Msamples/sec) to generate respective data samples 325A"" and 325B"" for the detector section 1005 of the receiver 1000.

The detector section 1005 comprises two demodulators 410A, 410B, Walsh transformer circuitry 420A, 420B, two buffers 720A, 720B, squaring and summing circuitry 430A, 430B, a summer 500", a selector 1010 and summing and squaring circuitry 725A", 725B". The demodulators 410A, 410B are connected to the receiver section 320"". The Walsh transformer circuitry 420A is connected to the demodulator 410A and to the buffer 720A. Similarly, the Walsh transformer circuitry 420B is connected to the demodulator 410B and to the buffer 720B. The squaring and summing circuitry 430A is connected to the buffer 720A and to the summer 500"". Similarly, the squaring and summing circuitry 430B is connected to the buffer 720B and to the summer 500". The summer 500" is connected to the selector 1010. The selector 1010 is connected to the summing and squaring circuitry 725A" and to the summing and squaring circuitry 725B". It should be understood that the order of the squaring and summing circuitry 430A' and the buffer 720A is interchangeable. Similarly, the position of the buffer 720B can be exchanged with that of the squaring and summing circuitry 430B.

In operation, the data samples 325A"" and 325B"" are carried from the receiver 320"" to the demodulators 410A and 410B, respectively. Each demodulator 410A, 410B is identical to the demodulator 410 in the single-maxima receiver 300 shown in FIG. 2 and operates in exactly the same way. That is, the demodulator 410A transforms groups of the samples 325A"" into groups of samples 412A of an in-phase signal and groups of samples 414A of a quadrature-phase signal. Similarly, the demodulator 410B transforms groups of the samples 325B"" into groups of samples 412B of an in-phase signal and groups of samples 414B of a quadrature-phase signal. The groups of samples 412A and 414A are carried from the demodulator 410A to the Walsh transformer circuitry 420A. Similarly, the groups of samples 412B and 414B are carried from the demodulator 410B to the Walsh transformer circuitry 420B.

Each Walsh transformer circuitry 420A, 420B is identical to the Walsh transformer circuitry 420 in the single-maxima receiver 300 shown in FIG. 2 and operates in exactly the same way. That is, for every group of 64 samples 412A of the in-phase signal and for every corresponding group of 64 samples 414A of the quadrature-phase signal, the Walsh transformer circuitry 420A generates a block, called a "transformer block", of 64 complex-valued transformer output signals 425A. Similarly, for every group of 64 samples 412B of the in-phase signal and for every corresponding group of 64 samples 414B of the quadrature-phase signal, the Walsh transformer circuitry 420B generates a block, called a "transformer block", of 64 complex-valued transformer output signals 425B.

Each block of complex transformer output signals 425A and 425B is associated with a complete block of Walsh codes. Furthermore, each complex transformer output signal 425A, 425B is a complex signal. For instance, one element (e.g., the real part) of the transformer output signal 425A is the result of a correlation between the samples 412A of the in-phase signal and the corresponding orthogonal code and the other element (e.g., the imaginary part) of the transformer output signal 425A is the result of a correlation between the samples 414B of the quadrature-phase signal and the corresponding orthogonal code. The Walsh transformer circuitry 420A typically comprises two Walsh transformers, one example of which is the Fast Hadamard Transformer (FHT). One Walsh transformer is used to generate the elements of the transformer output signal 425A associated with the in-phase signal, while the other Walsh transformer is used to generate the elements of the transformer output signal 425A associated with the quadrature-phase signal. Similarly, the Walsh transformer circuitry 420B typically comprises two Walsh transformers (such as two Fast Hadamard Transformers (FHTs))

Each block of transformer output signals 425A is carried from the Walsh transformer circuitry 420A to the buffer 720A in parallel fashion. (Alternatively, each transformer output signal in a transformer block may be carried to the buffer 720A serially). The buffer 720A buffers two blocks of transformer output signals 425A. (Alternatively, more than two blocks of transformer output signals 425B may be buffered). The two transformer blocks of transformer output signals 425A may be called a set of transformer blocks of transformer output signals 425A.

Similarly, each block of transformer output signals 425B is carried from the Walsh transformer circuitry 420B to the buffer 720B in parallel fashion. (Alternatively, each transformer output signal in a transformer block may be carried to the buffer 720B serially). The buffer 720B buffers two blocks of transformer output signals 425B. (Alternatively, more than two blocks of transformer output signals 425B may be buffered). The two transformer blocks of transformer output signals 425B may be called a set of transformer blocks of transformer output signals 425B.

When the buffer 720A is full (i.e. contains two blocks of transformer output signals 425A), all the blocks of transformer output signals 425A in the buffer 720A (i.e. associated with the two blocks of Walsh codes) are carried to the squaring and summing circuitry 430A and to the selector 1010 (typically in a parallel fashion).

Similarly, when the buffer 720B is full (i.e. contains two blocks of transformer output signals 425B), all the blocks of transformer output signals 425B in the buffer 720B (i.e. associated with the two blocks of Walsh codes) are carried to the squaring and summing circuitry 430B and the selector 1010 (typically in a parallel fashion).

Each squaring and summing circuitry 430A, 430B is identical to the squaring and summing circuitry 430 shown in FIG. 2 and operates in exactly the same way. That is, the squaring and summing circuitry 420A converts each block (in the set of two blocks) of transformer output signals 425A into energy values 445A" as previously described. Similarly, the squaring and summing circuitry 430B converts each block (in the set of two blocks) of transformer output signals 425B into energy values 445B" as previously described. The energy values 445A", 445B" are carried to the summer 500"".

The summer 500"" is identical to the summer 500 in the single-maxima receiver 300 shown in FIG. 2 and operates in exactly the same way. That is, the summer 500 adds the energy values 445A" directly with the energy values 445B" to create combined energy values 505". The combined energy values 505" are carried to the selector 1010.

Li The selector 1010 identifies a predetermined number L of the largest combined energy values 505" associated with each block of transformer output signals. (The preferred value of L is 5, although any number less than the number of transformer output signals can be used). The selector 1010 then selects the L transformer output signals (hereinafter called "set 1A") associated with the L largest combined energy values 505" from the first block of transformer output signals 425A and the L transformer output signals (hereinafter called "set 2A") associated with the L largest combined energy values 505" from the second block of transformer output signals 425A. Similarly, the selector 1010 selects the L transformer output signals (hereinafter called "set 1B") associated with the L largest combined energy values 505" from the first block of transformer output signals 425B and the L transformer output signals (hereinafter called "set 2B") associated with the L largest combined energy values 505" from the second block of transformer output signals 425B. Sets 1A and 2A are carried from the selector 1010 to the summing and squaring circuitry 725A" via a signal line 1020. Similarly, Sets 1B and 2B are carried to the summing and squaring circuitry 725B" via a signal line 1030.

Each summing and squaring circuitry 725A", 725B" is similar to the summing and squaring circuitry 725 of the single-maxima block detection receiver 700 shown in FIG. 5 and operates in a similar way. In particular, the summing and squaring circuitry 725A" adds together one transformer output signal 425A from set 1A with one transformer output signal 425A from set 2A in every possible combination to generate a group of summed signals. In this case, since set 1A and set 2A each have L transformer output signals 425A, the summing and squaring circuitry will generate LxL possible combinations (e.g., if L is 5, then there are 25 possible combinations).

The summing and squaring circuitry 725A" then computes the square of the modulus of each summed signal in the group of summed signals to generate a group of decision values (or energy values) 1035A associated with the groups of samples 325A"". Similarly, the summing and squaring circuitry 725B" generates a group of decision values (or energy levels) 1035B associated with the groups of samples 325B"".

The decision values (or energy levels) 1035A, 1035B are carried from the summing and squaring circuitry 725A", 725B", respectively, to the decoder section 718'.

The decoder section 718' is preferably identical to the decoder section 718 in the single-maxima block detection receiver 700 shown in FIG. 5 and operates in exactly the same way. In particular, the decoder section 718' consists of a summer 844", a single-maxima metric generator 850', a deinterleaver 550"" and a decoder 560"". The single-maxima metric generator 850' is connected to the summer 844" and to the deinterleaver 550"". The summer 84411 is connected to the summing and squaring circuitry 725A" and to the summing and squaring circuitry 725B". The deinterleaver 550"" is connected to the decoder 560"".

Figure 9:
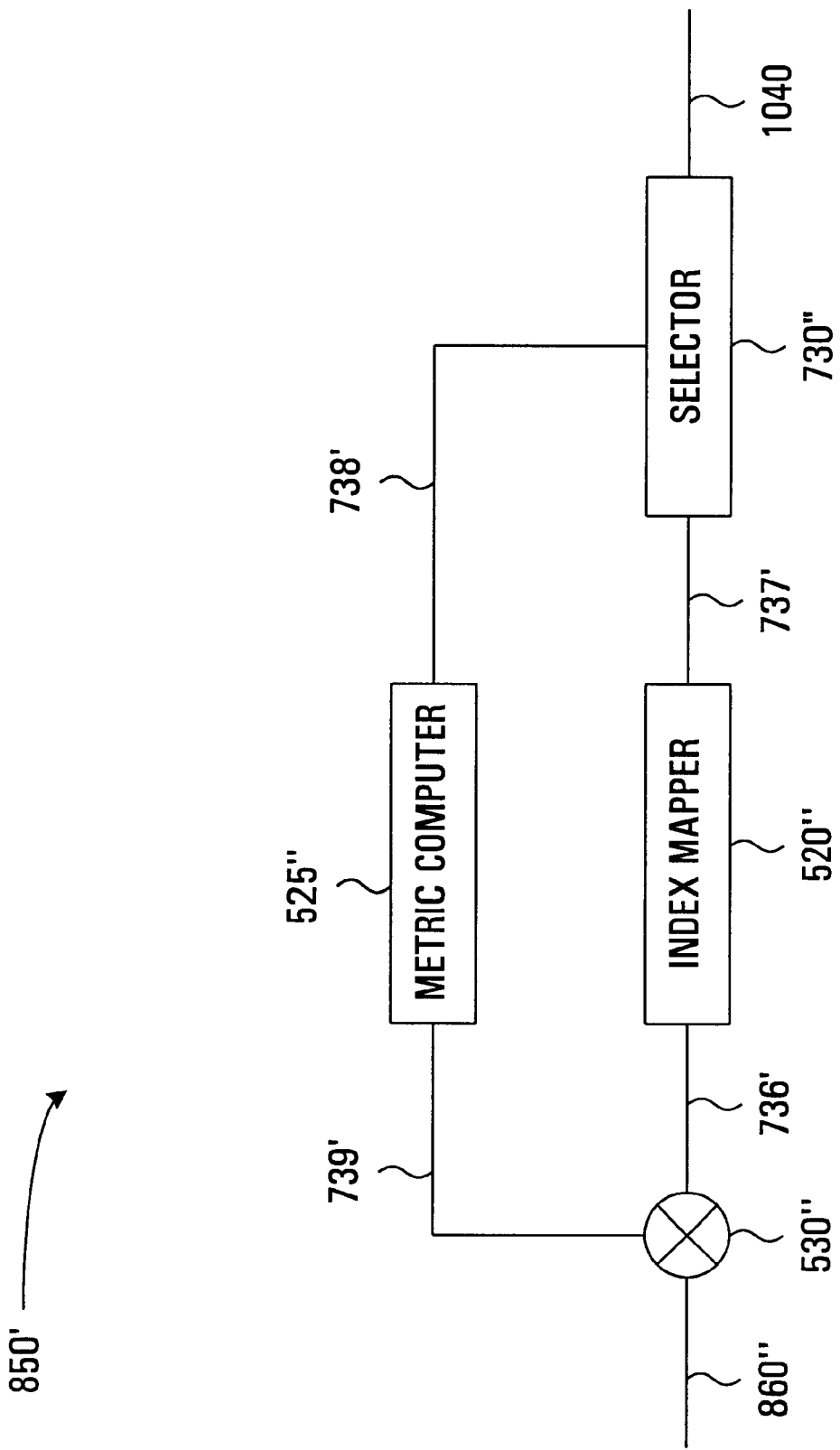
FIG. 9 is a block diagram of a single-maxima metric generator used by the block detection receiver shown in FIG. 8.

The single-maxima metric generator 850' is identical to the single-maxima metric generator 850 shown in FIG. 6. Referring to FIG. 9, the single-maxima metric generator 850' consists of a selector 730"", an index mapper 520"", a metric computer 525" and a multiplier 530". The selector 730" is connected to the metric computer 525" and to the index mapper 520". The metric computer 525" and the index mapper 520" are connected to the multiplier 530". The metric computer 525", the index mapper 520" and the multiplier 530" are identical to the metric computer 525', the index mapper 520' and the multiplier 530' in the single-maxima block detection receiver 700 shown in FIGS. 5 and 6 and operate in a similar way.

Operation of the decoder is now described with continued reference to FIGS. 8 and 9. The decision values 1035A and 1035B in each group of decision values are directly added together according to their associated orthogonal codes (or index symbols) by the summer 844" to generate a group of combined decision values 1040. The combined decision values 1040 are then carried to the single-maxima metric generator 850' which operates in a similarly to the single-maxima metric generator 850 found in the single-maxima receiver 700 shown in FIGS. 5 and 6. The selector 730" selects the largest combined decision value 738' from the group of combined decision values 1040 which is carried to the metric computer 525". The metric computer 525" then scales the largest combined decision value 738' to generate a scaling factor 739'.

The largest combined decision value 738' was derived from two complex transformer output signals, namely a complex transformer output signal from each of the two blocks of complex transformer output signals. Each transformer output signal has a corresponding index symbol 737'. The two corresponding index symbols 737' are carried from the selector 730" to the index mapper 520". It should be noted that the summing and squaring circuitry 725A" and 725B" need not generate and send to the selector 730" via the summer 844", the index symbols 737' associated with the largest decision value 738' when the combined decision values 1040 relating to the index symbols 737' are presented to the selector 730" in a predetermined order.

The index mapper 520"' maps each of the two index symbols 737' into a plurality of "1" and "−1" soft decision bits 736'. The soft decision bits 736' for each of the two index symbols 737' and a scaling factor 739' are carried to the multiplier 530"0 which multiplies each of the soft decision bits 736' for each of the two index symbols by the scaling factor 739' to generate soft decision data 860" for each of the two index symbols 737'. In particular, soft decision data 860" for each index symbol comprises six bits. The first bit of the soft decision data 860" for a particular index symbol represents a measure of confidence of the value of the first digit of the particular index symbol. In other words, the first bit of the soft decision data 860" for the first digit of a particular index symbol represents a measure of confidence of the value of the first digit of the respective interleaved data symbol 180 originally sent. The second bit of the soft decision data 860" for the second digit of a particular index symbol represents a measure of confidence of the value of the second digit of the particular index symbol, etc.

The soft decision data 860" is carried to the deinterleaver 550"".

Using the same process as described above, more soft decision data 860" is generated from the next set of transformer blocks, and so on. The next set of transformer blocks is the set of transformer blocks containing as the first transformer block, the transformer block immediately following the last transformer block used in the previous set of transformer blocks. In other words, none of the sets of transformer blocks are overlapping. For example, if the 3rd and 4th transformer blocks are first used to generate soft decision A data 860", then the 5th and 6th transformer blocks are used to generate more soft decision data 860").

The deinterleaver 550"" deinterleaves the soft decision data 860" and generates the interleaved soft decision data 870". The deinterleaver 550"" is identical to the deinterleaver 550" shown in FIG. 5 and operates in the same way. That is, the soft decision data 860" is input to a matrix of the pre-determined size (e.g., 18 by 32) in a row-by-row manner. The deinterleaved soft decision data 870" is output from the matrix of the predetermined size in a column-by-column manner. The deinterleaved soft decision data 870" is output by the deinterleaver 550"" at the same speed that the soft decision data 860 was input to the deinterleaver 550"" (e.g. 28.8 kmetrics/sec).

The deinterleaved soft decision data 870" is then carried from the deinterleaver 550"" to the decoder 560"" which utilizes maximum likelihood decoding techniques to estimate digital traffic data bits 880". Typically, the decoder 560"" is a Viterbi decoder.

For the $k^{th}$ set of transformer blocks, the method used by the reduced-complexity block detection receiver to determine the largest combined decision value (or largest energy value) can be described mathematically fairly easily as follows:

$$\text{Largest Energy Value } 738' = |r_{2k,j} + r_{2k+1,m}|^2, \ 1 \leq j, m \leq L$$

where $r_{2k,j}$ ($1 \leq j \leq L$) are the L transformer output signals associated with the L largest energy values for the $2k^{th}$ transformer block and $r_{2k+1,m}$ ($1 \leq m \leq L$) are the L transformer output signals associated with the L largest energy values for the $2k+1^{th}$ transformer block.

According to an alternative embodiment of the present invention, there is provided a single-maxima block detection receiver which is identical to the block detection receiver 1000 shown in FIG. 8 with the exception that the summing and squaring circuitry 725A" and 725B" is replaced with weighted summing and squaring circuitry as described with reference to the third and fourth preferred embodiments of the present invention.

Figure 10:
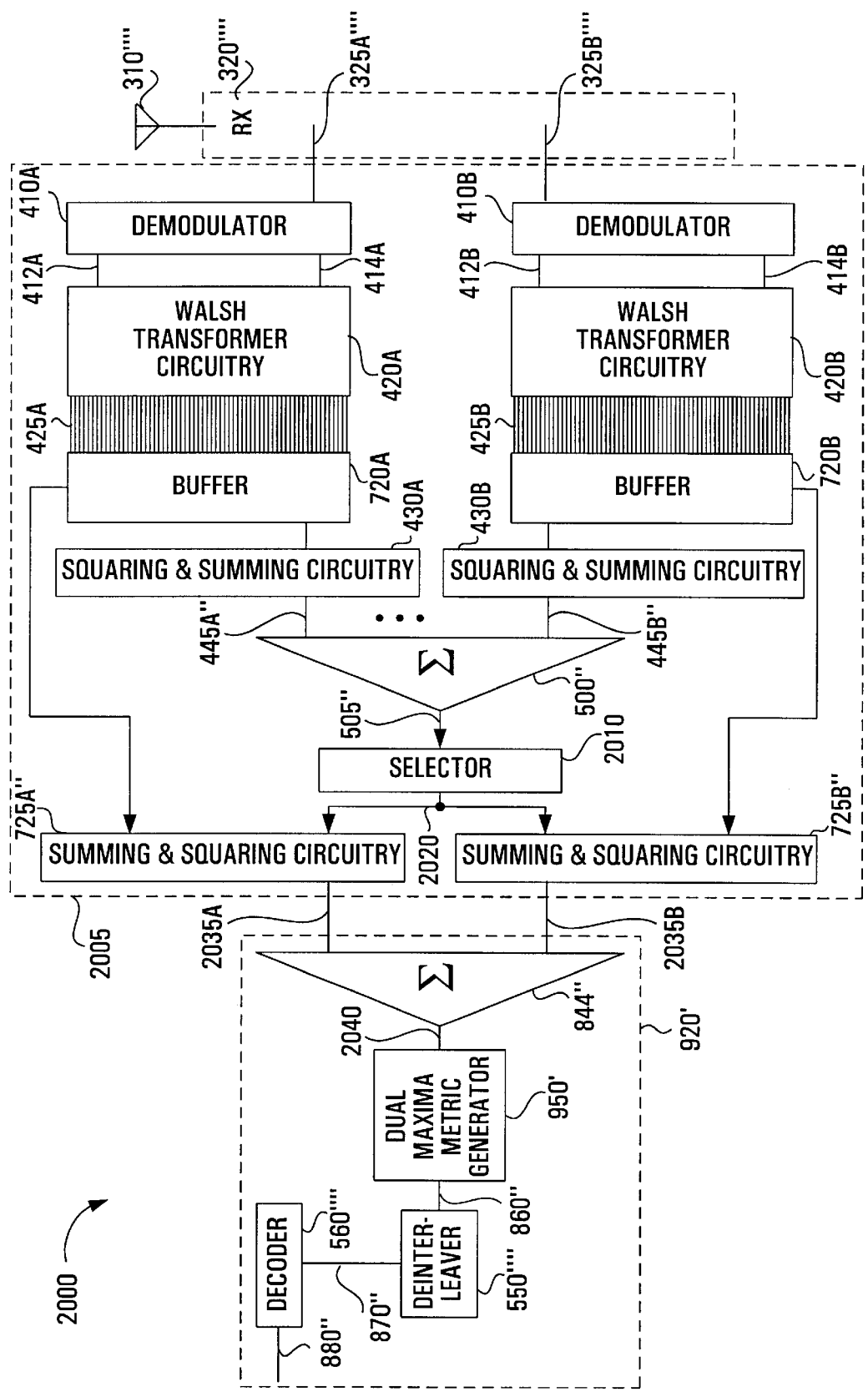
FIG. 10 is a block diagram of a block detection receiver used by a base station in accordance with a sixth preferred embodiment of the present invention.

In accordance with a sixth preferred embodiment of the present invention, there is provided a block detection receiver 2000 as shown in FIG. 10 which utilizes a second reduced complexity algorithm. The block detection receiver 2000 comprises an antenna 310"", a receiver section 320"", a detector section 2005 and a decoder section 920'. (Alternatively, more than one antenna 310"" may be used for space or path diversity reception). The receiver section 320"" is connected to the antenna 310"" and to the detector section 2005. The decoder section 920' is connected to the detector section 2005.

In particular, the receiver section 320"" consists of one receiver subsection. (If more than one antenna 310∝" is used, multiple receiver subsections would be employed, one for each antenna 310""). Each receiver subsection consists of a searcher receiver and two data receivers. (Alternatively, more than two data receivers can be used.) For each RF signal sent by the transmitter 100 of a mobile station, the searcher receiver searches the received spread-spectrum RF signals arriving via the various reverse paths for the strongest spread-spectrum RF signals associated with the transmitter 100 of the mobile station. The searcher receiver then instructs the data receivers to track and receive the RF signals carried in the reverse paths with the strongest levels. Each data receiver typically receives and tracks a separate RF signal. In particular, each data receiver demodulates the respective spread-spectrum RF signal and translates the respective spread-spectrum RF signal from the RF frequency to a respective processed received signal at a lower frequency. Furthermore, each data receiver samples at the PN chip rate (e.g. 1.2288 Msamples/sec) the respective processed received signal to generate respective data samples 325A"", and 325B"" for the detector section 1005 of the receiver 1000.

The detector section 2005 comprises two demodulators 410A, 410B, Walsh transformer circuitry 420A, 420B, two buffers 720A, 720B, squaring and summing circuitry 430A, 430B, a summer 500", a selector 2010 and summing and squaring circuitry 725A", 725B". The demodulators 410A, 410B are connected to the receiver section 320"". The Walsh transformer circuitry 420A is connected to the demodulator 410A and to the buffer 720A. Similarly, the Walsh transformer circuitry 420B is connected to the demodulator 410B and to the buffer 720B. The squaring and summing circuitry 430A is connected between the buffer 720A and the summer 500". Similarly, the squaring and summing circuitry 430B is connected between the buffer 720B and the summer 500". (Alternatively, the squaring and summing circuitry 430A can be connected between the Walsh transformer circuitry 420A and the buffer 720A and the squaring and summing circuitry 430B can be placed between the Walsh transformer circuitry 420B and the buffer 720B.) The summer 500" is connected to the selector 2010. The summing and squaring circuitry 725A" is connected to the selector 2010 and to the buffer 720A. The summing and squaring circuitry 725B" is connected to the selector 2010 and to the buffer 720B.

In operation, the data samples 325A"" and 325B"" are carried from the receiver 320"" to the demodulators 410A and 410B, respectively. Each demodulator 410A, 410B is identical to the demodulator 410 in the single-maxima receiver 300 shown in FIG. 2 and operates in exactly the same way. That is, the demodulator 410A transforms groups of the samples 325A"" into groups of samples 412A of an in-phase signal and groups of samples 414A of a quadrature-phase signal. Similarly, the demodulator 410B transforms groups of the samples 325B"" into groups of samples 412B of an in-phase signal and groups of samples 414B of a quadrature-phase signal. The groups of samples 412A and 414A are carried from the demodulator 410A to the Walsh transformer circuitry 420A. Similarly, the groups of samples 412B and 414B are carried from the demodulator 410B to the Walsh transformer circuitry 420B.

Each Walsh transformer circuitry 420A, 420B is identical to the Walsh transformer circuitry 420 in the single-maxima receiver 300 shown in FIG. 2 and operates in exactly the same way. That is, for every group of 64 samples 412A of the in-phase signal and for every corresponding group of 64 samples 414A of the quadrature-phase signal, the Walsh transformer circuitry 420A generates a block, called a "transformer block", of 64 complex transformer output signals 425A. Similarly, for every group of 64 samples 412B of the in-phase signal and for every corresponding group of 64 samples 414B of the quadrature phase signal, the Walsh transformer circuitry 420B generates a block, called a "transformer block", of 64 complex transformer output signals 425B.

Each block of complex transformer output signals 425A and 425B is associated with a complete block of Walsh codes. Furthermore, each complex transformer output signal 425A and 425B is a complex signal. For instance, one element (e.g., the real part) of the transformer output signal 425A is the result of a correlation between the samples 412A of the in-phase signal and the corresponding orthogonal code and the other element (e.g., the imaginary part) of the transformer output signal 425A is the result of a correlation between the samples 414B of the quadrature-phase signal and the corresponding orthogonal code. The Walsh transformer circuitry 420A typically comprises two Walsh transformers, an example of the which is the Fast Hadamard Transformer (FHT). One Walsh transformer is used to generate the elements of the transformer output signal 425A associated with the in-phase signal while the other Walsh transformer is used to generate the elements of the transformer output signal 425A associated with the quadrature-phase signal. Similarly, the Walsh transformer circuitry 420B typically comprises two Walsh transformers (such as two Fast Hadamard Transformers (FHTs)).

Each block of transformer output signals 425A is carried from the Walsh transformer circuitry 420A to the buffer 720A in parallel fashion. (Alternatively, each transformer output signal in a transformer block may be carried to the buffer 720A serially). The buffer 720A buffers two blocks of transformer output signals 425A. (Alternatively, more than two blocks of transformer output signals 425B may be buffered). The two transformer blocks together may be called a set of transformer blocks of transformer output signals 425A.

Similarly, each block of transformer output signals 425B is carried from the Walsh transformer circuitry 420B to the buffer 720B in parallel fashion. (Alternatively, each transformer output signal in a transformer block may be carried to the buffer 720B serially). The buffer 720B buffers two blocks of transformer output signals 425B. (Alternatively, more than two blocks of transformer output signals 425B may be buffered). The two transformer blocks of transformer output signals 425B may be called a set of transformer blocks of transformer output signals 425B.

When the buffer 720A is full (i.e. contains two blocks of transformer output signals 425A), all the blocks of transformer output signals 425A in the buffer 720A (i.e. associated with the two blocks of Walsh codes) are carried to the squaring and summing circuitry 430A and to the summing and squaring circuitry 725A" (typically in a parallel fashion).

Similarly, when the buffer 720B is full (i.e. contains two blocks of transformer output signals 425B), all the blocks of transformer output signals 425B in the buffer 720B (i.e. associated with the two blocks of Walsh codes) are carried to the squaring and summing circuitry 430B and to the summing and squaring circuitry 725B" (typically in a parallel fashion).

Each squaring and summing circuitry 430A, 430B is identical to the squaring and summing circuitry 430 shown in FIG. 2 and operates in exactly the same way. That is, the squaring and summing circuitry 430A converts each block (in the set of two blocks) of transformer output signals 425A into energy values 445A" as previously described. Similarly, the squaring and summing circuitry 430B converts each block (in the set of two blocks) of transformer output signals 425B into energy values 445B" as previously described. The energy values 445A", 445B" are carried to the summer 500".

The summer 500" is identical to the summer 500 in the single-maxima receiver 300 shown in FIG. 2 and operates in exactly the same way. That is, the summer 500 adds the energy values 445A" directly with the energy values 445B" to create combined energy values 505". The combined energy values 505" are carried to the selector 2010.

The selector 2010 identifies, for each block of combined energy values 505", the Walsh codes corresponding to the L largest combined energy values in that block. The selector 2010 forwards the identity of the so identified group of L Walsh codes for each block to the summing and squaring circuitry 725A" and to the summing and squaring circuitry 725B" along a common control line 2020.

The summing and squaring circuitry 725A" adds together transformer output signals 425A" received from the buffer 720A in two groups of "valid" combinations. The first group of valid combinations (hereinafter called group "1A") consists of summed signals resulting from all possible combinations of transformer output signals from the first transformer block paired with the those transformer output signals from the second transformer block which have the L largest combined energy values as identified by the selector 2010.

The second group of valid combinations (hereinafter called group "2A") consists of summed signals resulting from those transformer output signals from the first transformer block which have the L largest combined energy values (as identified by the selector 2010) paired with all possible combinations of transformer output signals from the second transformer block.

Next, the summing and squaring circuitry 725A" computes the square (or a monotonic function) of the modulus of each summed signal in each of the two groups 1A, 2A of summed signals to generate respective groups of decision values (or energy values) 2035A. The two groups of decision values (or energy values) 2035A are carried from the summing and squaring circuitry 725A" to the decoder section 920'.

In a similar fashion, the summing and squaring circuitry 725B" sums the transformer output signals 425B" received from the buffer 720B in two groups (called 1B and 2B) of valid combinations. Subsequently, the summing and squaring circuitry 725B" computes the square (or a monotonic function) of the modulus of each summed signal in each of the groups 1B, 2B of summed signals to generate respective groups of decision values (or energy values) 2035B.

In general, for the case where a set of transformer blocks comprises B blocks of transformer output signals, it is noted that the total number of summations performed by the summing and squaring circuitry 725A" or 725B" is equal to $L*64$, which is generally between $L^B$ (the number of combinations that would be summed according to the fifth preferred embodiment of the invention) and $64^B$ (the number of combinations that would be summed according to the first and second preferred embodiments of the invention). The two groups of decision values (or energy values) 2035B are carried from the summing and squaring circuitry 725B" to the decoder section 920'.

The decoder section 920' consists of a summer 844", a dual-maxima metric generator 950', a deinterleaver 550"" and a decoder 560"". The dual-maxima metric generator 950' is connected to the summer 844" and to the deinterleaver 550"". The deinterleaver 550"" is connected to the decoder 560"". The summer 844" is also connected to the summing and squaring circuitry 725A" and to the summing and squaring circuitry 725B". The summer 844", the deinterleaver 550"" and the decoder 560"" are identical to the summer 844, the deinterleaver 550" and the decoder 860" found in the single-maxima block detection receiver 700 shown in FIG. 5 and operate in a similar same way.

In operation, each group of decision values 2035A and 2035B are directly added together according to their associated orthogonal codes (or index symbols) by the summer 844" to generate two groups (hereinafter called groups X and Y) of combined decision values 2040. It is noted that the first group (i.e., group X) of combined decision values 2040 contains $L*64$ values corresponding to groups 1A and 1B of valid combinations, while the second group (i.e., group Y) of combined decision values 2040 contains $L*64$ values corresponding to groups 2A and 2B of valid combinations.

Groups X and Y of combined decision values 2040 are then carried to the dual-maxima metric generator 950' which operates similarly to the dual-maxima metric generator 610 found in the dual-maxima receiver 600 shown in FIG. 4.

After acquiring groups X and Y of combined decision values 2040, the dual-maxima metric generator 950' first searches for the largest combined decision value in a first subset of the combined decision values 2040 in group X which have associated index symbols associated with the first transformer block having "0" as the first digit. The dual-maxima metric generator 950' then searches for the largest combined decision value in a second subset of the set of combined decision values 2040 in group X which have associated index symbols associated with the first transformer block having "1" as a first digit.

The difference between the largest combined decision value 2040 in the first subset and the largest combined decision value 2040 in the second subset is output from the dual-maxima metric generator 950' as soft decision data 860" for the first digit of the index symbol corresponding to the orthogonal code most likely sent and associated with the first transformer block. The soft decision data 860" for first digit of the index symbol represents a measure of confidence of the value of the first digit of the particular index symbol. In other words, the soft decision data 860" for the first digit of the index symbol represents a measure of confidence of the value of the first digit of the respective interleaved data symbol 180 originally sent.

Next, the dual-maxima metric generator 950' searches for the largest combined decision value in a third subset of the set of combined decision values 2040 in group X which have associated index symbols associated with the first transformer block having "0" as a second digit and searches for the largest combined decision value in a fourth subset of the set of combined decision values 2040 in group X which have associated index symbols associated with the first transformer block having "1" as a second digit.

The difference between the largest combined decision values 2040 is output as soft decision data 860" for the second digit of the index symbol corresponding to the orthogonal code most likely sent and associated with the first transformer block. The soft decision data 860" for second digit of the index symbol represents a measure of confidence of the value of the second digit of the index symbol corresponding to the orthogonal code most likely sent. In other words, the soft decision data 860" for the second digit of the index symbol represents a measure of confidence of the value of the second digit of the respective interleaved data symbol 180 originally sent.

This process continues until the dual-maxima metric generator 950' soft decision data 860" for the last digit in the index symbol corresponding to the orthogonal code most likely sent and associated with the first transformer block. In other words, for a block of size 64, the above process continues until soft decision data 860' is generated for 6 bits.

Next, the dual-maxima metric generator 950' searches for the largest combined decision value in a first subset of the combined decision values 2040 in group Y which have associated index symbols associated with the second transformer block having "0" as the first digit. The dual-maxima metric generator 950' then searches for the largest combined decision value in a second subset of the set of combined decision values 2040 in group Y which have associated index symbols associated with the second transformer block having "1" as a first digit.

The difference between the largest combined decision value 2040 in the first subset and the largest combined decision value 2040 in the second subset is output from the dual-maxima metric generator 950' as soft decision data 860" for the first digit of the index symbol corresponding to the orthogonal code most likely sent and associated with the second transformer block. The soft decision data 860" for first digit of the index symbol represents a measure of confidence of the value of the first digit of the particular index symbol. In other words, the soft decision data 860" for the first digit of the index symbol represents a measure of confidence of the value of the first digit of the respective interleaved data symbol 180 originally sent.

Next, the dual-maxima metric generator 950' searches for the largest combined decision value in a third subset of the set of combined decision values 2040 in group Y which have associated index symbols associated with the second transformer block having "0" as a second digit and searches for the largest combined decision value in a fourth subset of the set of combined decision values 2040 in group Y which have associated index symbols associated with the second transformer block having "1" as a second digit.

The difference between the largest combined decision values 2040 is output as soft decision data 860" for the second digit of the index symbol corresponding to the orthogonal code most likely sent and associated with the second transformer block. The soft decision data 860" for second digit of the index symbol represents a measure of confidence of the value of the second digit of the index symbol corresponding to the orthogonal code most likely sent. In other words, the soft decision data 860" for the second digit of the index symbol represents a measure of confidence of the value of the second digit of the respective interleaved data symbol 180 originally sent.

This process continues until the dual-maxima metric generator 950' soft decision data 860" for the last digit in the index symbol corresponding to the orthogonal code most likely sent and associated with the second transformer block. In other words, for a block of size 64, the above process continues until soft decision data 860' is generated for 6 bits.

The method used by the dual-maxima block detection receiver 2000 to generate the soft decision data associated with the kth transformer block, the k+1$^{th}$ transformer block and the k+2$^{th}$ transformer block may be represented mathematically fairly easily as follows:

$$\Delta_i = \max\{|r_{2k,m} + r_{2k+1,n}|^2, m, n \in S_{2,i}\} -$$
$$\max\{|r_{2k,m} + r_{2k+1,n}|^2, m, n \in \overline{S_{2,i}}\}, 1 \le i \le 6,$$

$$\Delta_i = \max\{|r_{2k,m} + r_{2k+1,n}|^2, m, n \in S_{1,i}\} -$$
$$\max\{|r_{2k,m} + r_{2k+1,n}|^2, m, n \in \overline{S_{1,i}}\}, 7 \le i \le 12,$$

where $r_{s,t}$ is the s$^{th}$ transformer output signal for the t$^{th}$ transformer block and where where $r_{s,t}$ is the s$^{th}$ transformer output signal for the t$^{th}$ transformer block and where $S_{1,i} = \{\in L_{1,i}, 1 \le n \le 64:$ i$^{th}$ corresponding bit is "0"$\}$;
$\overline{S_{1,i}} = \{\in L_{1,i}, 1 \le n \le 64:$ i$^{th}$ corresponding bit is "1"$\}$;
$S_{2,i} = \{1 \le m \le 64, n \in L_{2,i}:$ i$^{th}$ corresponding bit is "0"$\}$;

The set $L_{1,i}$ is the set of index symbols corresponding to the L largest values of the transformer output signals associated with the first transformer block, while the set $L_{2,i}$ is the set of index symbols corresponding to the L largest values of the transformer output signals associated with the second transformer block.

It is noted that $\Delta_i$, where $1 \le i \le 6$, is the soft decision data associated with the first transformer block and $\Delta_i$, where $7 \le i \le 12$, is the soft decision data associated with the second transformer block.

According to another embodiment of the invention, there is provided a dual-maxima block detection receiver which is identical to the block detection receiver 2000 shown in FIG. 10 with the exception that the summing and squaring circuitry 725A" and 725B" is replaced with weighted summing and squaring circuitry as described with reference to the third and fourth preferred embodiments of the present invention.

The detection performance (e.g., the signal-to-noise ratio) of a block detection receiver implemented in accordance with any embodiment or variation of the present invention is improved relative to that of a conventional receiver because decisions about the transmitted Walsh codes are delayed until multiple blocks of data are received and then considered in various combinations. Some of the described schemes (e.g., the first, second, third and fourth preferred embodiments) optimize over all possible combinations of codes, while others (e.g., the fifth and sixth preferred embodiments) consider a reduced number of combinations with the reduction being based on the assumption that a code with a high energy value for one block in a set is likely to figure among the codes actually transmitted for that set of blocks.

While the preferred embodiments and various alternatives of the present invention have been described and illustrated, it will be apparent to one skilled in the art that numerous further modifications can be made while remaining within the scope of the invention as defined in the claims appended hereto.

We claim:

1. A method of detecting codes carried in a received signal processed into blocks of values, each block being associated with a respective time interval of the received signal, the method comprising:

arranging the blocks into non-overlapping sets of at least two blocks per set; and for each set, executing a code detection operation over combinations of values, each combination containing one value from each block in the set.

2. A method as claimed in claim 1, wherein each combination is associated with a sequence of codes, one code for each block in the set, and wherein the code detection operation comprises, for each set of blocks:

for each combination, summing the values in the combination to produce a summed value;

for each summed value, determining the presence of a characteristic therein;

identifying the combination having a summed value with the strongest presence of said characteristic; and selecting the sequence of codes associated with the combination so identified.

3. A method as claimed in claim 2, wherein the values and summed values are complex with a modulus, and wherein said characteristic is the square modulus.

4. A method as claimed in claim 2, wherein the values and summed values are complex with a modulus, and wherein said characteristic is a monotonic function of the modulus.

5. A method as claimed in claim 2, wherein each code has an associated index symbol, further comprising:

selecting the index symbols associated with the codes in the selected sequence of codes to generate soft decision data.

6. A method as claimed in claim 5, wherein each code has an associated index symbol, further comprising:

scaling the soft decision data in accordance with the summed value of the combination associated with the selected sequence of codes.

7. A method as claimed in claim 6, further comprising:

deinterleaving the soft decision data; and decoding the deinterleaved soft decision data into digital traffic data bits.

8. A method as claimed in claim 2, wherein the codes are Walsh codes.

9. A method as claimed in claim 2, wherein the codes are orthogonal codes.

10. A method as claimed in claim 2 for use in a demodulator, wherein said values are transformed values of de-spread samples of the received signal.

11. A method as claimed in claim 1, wherein each combination is associated with a sequence of multi-bit index symbols and wherein the code detection operation comprises, for each set of blocks:

for each combination, summing the values in the combination to produce a summed value;

for each summed value, determining the presence of a characteristic therein; and for each possible bit position in a multi-bit index symbol:
in a subset of combinations consisting of those combinations whose associated multi-bit index symbol has a logical "1" in said bit position, identifying the combination having a summed value with the strongest presence of said characteristic, that combination being a first combination;

in a subset of combinations consisting of those combinations whose associated multi-bit index symbol has a logical "0" in said bit position, identifying the combination having a summed value with the strongest presence of said characteristic, that combination being a second combination; and generating soft decision data based on the multi-bit index symbols and summed values associated with the first and second combination corresponding to each bit position.

12. A method as claimed in claim 11, further comprising:
deinterleaving the soft decision data; and
decoding the deinterleaved soft decision data into digital traffic data bits.

13. A method as claimed in claim 11, wherein the codes are Walsh codes.

14. A method as claimed in claim 11, wherein the codes are orthogonal codes.

15. A method as claimed in claim 11 for use in a demodulator, wherein said values are transformed values of de-spread samples of the received signal.

16. A method as claimed in claim 1, further comprising, between the steps of arranging the blocks and executing a code detection operation, the step of:

for each set of blocks, identifying a subset of combinations among all possible combinations of values having one value from each block in the set;

wherein the code detection operation is carried out over only the combinations of values in said subset.

17. A method as claimed in claim 16, wherein the values in each block are complex with a modulus and wherein the step of identifying a subset comprises, for each set of blocks:

for each value in at least one designated block in the set, determining the square modulus of said value;

selecting only those combinations whose values from a designated block have moduli among the L largest for values in that block.

18. A method as claimed in claim 2, further comprising, between the steps of arranging the blocks and executing a code detection operation, the step of:

for each set of blocks, identifying a subset of combinations among all possible combinations of values having one value from each block in the set;

wherein the code detection operation is carried out over only the combinations of values in said subset.

19. A method as claimed in claim 18, wherein the values in each block are complex with a modulus and wherein the step of identifying a subset comprises, for each set of blocks:

for each value in at least one designated block in the set, determining the square modulus of said value;

selecting only those combinations whose values from a designated block have moduli among the L largest for values in that block.

20. A method as claimed in claim 11, further comprising, between the steps of arranging the blocks and executing a code detection operation, the step of:

for each set of blocks, identifying a subset of combinations among all possible combinations of values having one value from each block in the set;

wherein the code detection operation is carried out over only the combinations of values in said subset.

21. A method as claimed in claim 20, wherein the values in each block are complex with a modulus and wherein the step of identifying a subset comprises, for each set of blocks:

for each value in at least one designated block in the set, determining the square modulus of said value;

selecting only those combinations whose values from a designated block have moduli among the L largest for values in that block.

22. A method as claimed in claim 2, further comprising, prior to the step of summing:

for each combination of values, scaling each value in the combination on the basis of the block from which each value originates.

23. A method as claimed in claim 11, further comprising, prior to the step of summing:

for each combination of values, scaling each value in the combination on the basis of the block from which each value originates.

24. A method as claimed in claim 18, further comprising, prior to the step of summing:

for each combination of values, scaling each value in the combination on the basis of the block from which each value originates.

25. A method as claimed in claim 20, further comprising, prior to the step of summing:

for each combination of values, scaling each value in the combination on the basis of the block from which each value originates.

26. A method of detecting codes carried in a received signal processed into blocks of values, each block being associated with a respective time interval of the received signal, the method comprising:

for each stream of blocks, arranging the blocks into non-overlapping sets of at least two blocks per set, thereby to produce a respective stream of sets of blocks;

combining the values from sets of blocks in different streams to form sets of blocks of combined values; and for each set of blocks of combined values, executing a code detection operation over combinations of combined values, each combination containing one combined value from each block in the set.

27. A method as claimed in claim 26, wherein each combination is associated with a sequence of codes, one code for each block in the set, and wherein the code detection operation comprises, for each set of blocks:

for each combination, summing the combined values in the combination to produce a summed value;

for each summed value, determining the presence of a characteristic therein;

identifying the combination having a summed value with the strongest presence of said characteristic; and selecting the sequence of codes associated with the combination so identified.

28. A method as claimed in claim 27, wherein the values, combined values and summed values are complex with a modulus, and wherein said characteristic is the square modulus.

29. A method as claimed in claim 27, wherein the values, combined values and summed values are complex with a modulus, and wherein said characteristic is a monotonic function of the modulus.

30. A method as claimed in claim 27, wherein each code has an associated index symbol, further comprising:
   selecting the index symbols associated with the codes in the selected sequence of codes to generate soft decision data.

31. A method as claimed in claim 30, wherein each code has an associated index symbol, further comprising:
   scaling the soft decision data in accordance with the summed value of the combination associated with the selected sequence of codes.

32. A method as claimed in claim 31, further comprising:
   deinterleaving the soft decision data; and
   decoding the deinterleaved soft decision data into digital traffic data bits.

33. A method as claimed in claim 27, wherein the codes are Walsh codes.

34. A method as claimed in claim 27, wherein the codes are orthogonal codes.

35. A method as claimed in claim 27 for use in a demodulator, wherein each stream of blocks of values is associated with a finger and wherein the values are transformed values of de-spread samples of the received signal.

36. A method as claimed in claim 26, wherein each combination is associated with a sequence of multi-bit index symbols and wherein the code detection operation comprises, for each set of blocks:
   for each combination, summing the combined values in the combination to produce a summed value;
   for each summed value, determining the presence of a characteristic therein; and
   for each possible bit position in a multi-bit index symbol:
      in a subset of combinations consisting of those combinations whose associated multi-bit index symbol has a logical "1" in said bit position, identifying the combination having a summed value with the strongest presence of said characteristic, that combination being a first combination;
      in a subset of combinations consisting of those combinations whose associated multi-bit index symbol has a logical "0" in said bit position, identifying the combination having a summed value with the strongest presence of said characteristic, that combination being a second combination; and
   generating soft decision data based on the multi-bit index symbols and summed values associated with the first and second combination corresponding to each bit position.

37. A method as claimed in claim 36, further comprising:
   deinterleaving the soft decision data; and
   decoding the deinterleaved soft decision data into digital traffic data bits.

38. A method as claimed in claim 36, wherein the codes are Walsh codes.

39. A method as claimed in claim 36, wherein the codes are orthogonal codes.

40. A method as claimed in claim 36 for use in a demodulator, wherein said values are transformed values of de-spread samples of the received signal.

41. A method as claimed in claim 26, further comprising, between the steps of combining and executing a code detection operation, the step of:
   for each set of blocks, identifying a subset of combinations among all possible combinations of combined values having one combined value from each block in the set;
   wherein the code detection operation is carried out over only the combinations of combined values in said subset.

42. A method as claimed in claim 41, wherein the combined values in each block are complex with a modulus and wherein the step of identifying a subset comprises, for each set of blocks:
   for each combined value in at least one designated block in the set, determining the square modulus of said combined value;
   selecting only those combinations whose combined values from a designated block have moduli among the L largest for combined values in that block.

43. A method as claimed in claim 27, further comprising, between the steps of combining and executing a code detection operation, the step of:
   for each set of blocks, identifying a subset of combinations among all possible combinations of combined values having one combined value from each block in the set;
   wherein the code detection operation is carried out over only the combinations of combined values in said subset.

44. A method as claimed in claim 43, wherein the combined values in each block are complex with a modulus and wherein the step of identifying a subset comprises, for each set of blocks:
   for each combined value in at least one designated block in the set, determining the square modulus of said combined value;
   selecting only those combinations whose combined values from a designated block have moduli among the L largest for combined values in that block.

45. A method as claimed in claim 36, further comprising, between the steps of combining and executing a code detection operation, the step of:
   for each set of blocks, identifying a subset of combinations among all possible combinations of combined values having one combined value from each block in the set;
   wherein the code detection operation is carried out over only the combinations of combined values in said subset.

46. A method as claimed in claim 45, wherein the combined values in each block are complex with a modulus and wherein the step of identifying a subset comprises, for each set of blocks:
   for each combined value in at least one designated block in the set, determining the square modulus of said combined value;
   selecting only those combinations whose combined values from a designated block have moduli among the L largest for combined values in that block.

47. A method as claimed in claim 27, further comprising, prior to the step of summing:
   for each combination of combined values, scaling each combined value in the combination on the basis of the blocks from which each combined value is derived.

48. A method as claimed in claim 36, further comprising, prior to the step of summing:

for each combination of combined values, scaling each combined value in the combination on the basis of the blocks from which each combined value is derived.

49. A method as claimed in claim 43, further comprising, prior to the step of summing:

for each combination of combined values, scaling each combined value in the combination on the basis of the blocks from which each combined value is derived.

50. A method as claimed in claim 45, further comprising, prior to the step of summing:

for each combination of combined values, scaling each combined value in the combination on the basis of the blocks from which each combined value is derived.

51. A block detection receiver, comprising:

at least one finger, each finger comprising means for processing a received signal to provide sets of non-overlapping blocks of processed values, each block being associated with a respective time interval of the received signal;

means connected to the fingers, for combining a set of blocks of processed values from each finger into a set of blocks of combined processed values; and a metric generator connected to the combining means, for executing a code detection operation over combinations of processed values in each set, said combinations having one processed value from each block in the set.

52. A block detection receiver as claimed in claim 51, wherein the metric generator comprises a selection unit operable to identify a subset of combinations among all possible combinations of processed values having one processed value from each block in a set and processing only those combinations so identified.

53. A block detection receiver as claimed in claim 51, wherein the metric generator comprises a weighting unit operable to scale each processed value in a combination of processed values on the basis of the block from which the processed value is taken.

54. A block detection receiver as claimed in claim 52, wherein the metric generator comprises a weighting unit operable to scale each processed value in a combination of processed values on the basis of the block from which the processed value is taken.

55. A block detection receiver, comprising:

a transformer for performing block-wise correlations between a received signal and a plurality of codes, thereby to generate blocks of transformed values, each block being associated with a respective time interval of the received signal;

a buffer connected to the transformer, for arranging the blocks into a stream of non-overlapping sets of blocks of transformed values of at least two blocks per set, the at least two blocks per set being associated with distinct time intervals of the received signal; and processing means connected to the buffer, for executing a code detection operation over combinations of transformed values, each combination containing one transformed value from each block in a set.

56. A block detection receiver as claimed in claim 52, wherein the processing means comprises:

first circuitry connected to the buffer, for summing the values in each combination in each set of blocks to produce a respective summed value and determining, for each said summed value, the presence of a characteristic therein;

second circuitry connected to the first circuitry, for identifying the combination in a set of blocks having a summed value with the strongest presence of said characteristic and selecting the sequence of codes associated with the combination so identified.

57. A block detection receiver as claimed in claim 56, wherein the transformed values and summed values are complex with a modulus, wherein said characteristic is the square modulus and wherein said second circuitry is a single-maxima metric generator.

58. A block detection receiver as claimed in claim 55, wherein the processing means comprises:

a summer connected to the buffer, for adding the values in each combination in a set of blocks to produce respective summed values;

circuitry connected to the summer, for determining the square modulus of each summed value corresponding to a set of blocks; and a dual-maxima metric generator connected to said circuitry, for generating soft decision data based on the square moduli received from said circuitry.

59. A block detection receiver as claimed in claim 55, wherein the processing means comprises a selection unit operable to identify a subset of combinations among all possible combinations of transformed values having one transformed value from each block in a set and processing only those combinations so identified.

60. A block detection receiver as claimed in claim 56, wherein the processing means comprises a selection unit operable to identify a subset of combinations among all possible combinations of transformed values having one transformed value from each block in a set and processing only those combinations so identified.

61. A block detection receiver as claimed in claim 58, wherein the processing means comprises a selection unit operable to identify a subset of combinations among all possible combinations of transformed values having one transformed value from each block in a set and processing only those combinations so identified.

62. A block detection receiver as claimed in claim 55, wherein the processing means comprises a weighting unit operable to scaling each transformed value in a combination on the basis of the block from which said transformed value is taken.

63. A block detection receiver as claimed in claim 56, wherein the processing means comprises a weighting unit operable to scaling each transformed value in a combination on the basis of the block from which said transformed value is taken.

64. A block detection receiver as claimed in claim 58, wherein the processing means comprises a weighting unit operable to scaling each transformed value in a combination on the basis of the block from which said transformed value is taken.

65. A block detection receiver, comprising:

a plurality of transformers for performing block-wise correlations between a received signal and a plurality of codes, thereby to generate blocks of transformed values for each transformer;

a plurality of buffers, each buffer connected to a respective transformer, for arranging the blocks received from the respective transformer into a respective stream of non-overlapping sets of blocks of transformed values of at least two blocks per set;

a plurality of energy detectors, each energy detector connected to a respective one of the buffers, for detecting the energy of each transformed value in a set of blocks of transformed values received from the respective buffer and producing a respective set of energy values;

combining means connected to the energy detectors, for combining the energy values from each energy detector into a stream of combined energy values; and processing means connected to the combining means, for processing the combined energy values and executing a code detection operation over combinations combined energy values, each combination of combined energy values having one combined energy value corresponding to each block in a set.

66. A computer-readable storage medium which, when read by a computer, executes a sequence of steps to detect codes carried in a received signal processed into blocks of values, each block being associated with a respective time intervals of the received signal, the steps comprising: arranging the blocks into non-overlapping sets of at least two blocks per set; and for each set, executing a code detection operation over combinations of values, each combination containing one value from each block in the set.

67. A computer-readable storage medium which, when read by a computer, executes a sequence of steps to detect codes carried in a received signal processed into a plurality of streams of blocks of values, each blocks being associated with a respective time interval of the received signal, the steps comprising: for each stream of blocks, arranging the blocks into non-overlapping sets of at least two blocks per set, thereby to produce a respective stream of sets of blocks; combining the values from sets of blocks in different streams to form sets of blocks of combined values; and for each set of blocks of combined values, executing a code detection operation over combinations of combined values, each combination containing one combined value from each block in the set.

* * * * *